(12) United States Patent
Kondo et al.

(10) Patent No.: US 6,553,381 B2
(45) Date of Patent: *Apr. 22, 2003

(54) TIME-VARYING RANDOMIZATION FOR DATA SYNCHRONIZATION AND IMPLICIT INFORMATION TRANSMISSION

(75) Inventors: Tetsujiro Kondo, Kanagawa-Prefecture (JP); Yasuhiro Fujimori, Cupertino, CA (US); William Knox Carey, San Jose, CA (US); James J. Carrig, San Jose, CA (US)

(73) Assignees: Sony Corporation, Tokyo (JP); Sony Electronics Inc., Park Ridge, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 10/002,872

(22) Filed: Nov. 14, 2001

(65) Prior Publication Data

US 2002/0059550 A1 May 16, 2002

Related U.S. Application Data

(62) Division of application No. 09/342,275, filed on Jun. 29, 1999.

(51) Int. Cl.[7] .............................................. G06F 17/30
(52) U.S. Cl. .......................... 707/101; 707/10; 707/201
(58) Field of Search ................................. 707/101, 104, 707/2, 3, 10, 201, 206; 709/101, 102, 223, 228, 231, 232; 717/110; 700/83; 345/636

(56) References Cited

U.S. PATENT DOCUMENTS 3,311,879 A    3/1967  Daher
3,805,232 A    4/1974  Allen
3,811,108 A    5/1974  Howell ............ 340/146.01 AL
4,361,853 A    11/1982 Remy et al.
4,381,519 A    4/1983  Wilkinson et al.
4,394,642 A    7/1983  Currie et al. ................ 340/347

(List continued on next page.)

FOREIGN PATENT DOCUMENTS

EP    0 359 729 A2    12/1989
EP    0 398 741 A     11/1990

(List continued on next page.)

OTHER PUBLICATIONS

Blackmon, F.; Sozer, E.; Murandian, M.; Proakis, J.; Salehi, M. discloses performance comparison of iterative/integral equalizer/decoder structures for underwater acoustic channels; Oceans, 2001. M.S./IEEE Conference and Exhibition, vol.: 4, 2001–Pag.*

(List continued on next page.)

*Primary Examiner*—Diane D. Mizrahi
(74) *Attorney, Agent, or Firm*—Blakely, Sokoloff, Taylor & Zafman LLP

(57) ABSTRACT

The present invention provides a system and method for the time-varying randomization of a signal stream to provide for a robust error recovery. A current block of data is randomized in accordance with data from the current block and data from at least one temporally adjacent block of data. The present invention also provides a system and method for time-varying derandomization of a randomized signal stream and alternately delayed-decoding of the signal stream. Randomized data is derandomized using the current block of data and data from at least one temporally adjacent block. In addition, decoding of the current block and the adjacent block is delayed in order to facilitate recovery of lost or damaged compression parameters of encoded data.

1 Claim, 31 Drawing Sheets

PACKET STRUCTURE 200

U.S. PATENT DOCUMENTS

| | | |
|---|---|---|
| 4,419,693 A | 12/1983 | Wilkinson et al. |
| 4,532,628 A | 7/1985 | Matthews |
| 4,574,393 A | 3/1986 | Blackwell et al. |
| 4,703,351 A | 10/1987 | Kondo |
| 4,703,352 A | 10/1987 | Kondo |
| 4,710,811 A | 12/1987 | Kondo |
| 4,722,003 A | 1/1988 | Kondo |
| 4,729,021 A | 3/1988 | Kondo |
| 4,772,947 A | 9/1988 | Kondo |
| 4,788,589 A | 11/1988 | Kondo |
| 4,796,299 A | 1/1989 | Hamilton ..................... 380/14 |
| 4,815,078 A | 3/1989 | Shimura |
| 4,845,560 A | 7/1989 | Kondo et al. |
| 4,890,161 A | 12/1989 | Kondo |
| 4,924,310 A | 5/1990 | Von Brandt |
| 4,953,023 A | 8/1990 | Kondo |
| 4,975,915 A | 12/1990 | Sako et al. |
| 5,023,710 A | 6/1991 | Kondo et al. |
| 5,065,446 A | 11/1991 | Suzuki et al. ................. 382/56 |
| 5,086,489 A | 2/1992 | Shimura |
| 5,093,872 A | 3/1992 | Tutt |
| 5,101,446 A | 3/1992 | Resnikoff et al. |
| 5,122,873 A | 6/1992 | Golin |
| 5,134,479 A | 7/1992 | Ohishi |
| 5,142,537 A | 8/1992 | Kutner et al. |
| 5,150,210 A | 9/1992 | Hoshi et al. |
| 5,159,452 A | 10/1992 | Kinoshita |
| 5,166,987 A | 11/1992 | Kageyama |
| 5,177,797 A | 1/1993 | Takenaka et al. |
| 5,185,746 A | 2/1993 | Tanaka et al. |
| 5,196,931 A | 3/1993 | Kondo |
| 5,208,816 A | 5/1993 | Seshardi et al. |
| 5,237,424 A | 8/1993 | Nishino et al. |
| 5,241,381 A | 8/1993 | Kondo |
| 5,243,428 A | 9/1993 | Challapali et al. |
| 5,258,835 A | 11/1993 | Kato |
| 5,301,018 A | 4/1994 | Smidth et al. |
| 5,307,175 A | 4/1994 | Seachman |
| 5,307,377 A | 4/1994 | Chouly et al. ................ 375/39 |
| 5,321,748 A | 6/1994 | Zeidler et al. |
| 5,327,502 A | 7/1994 | Katata et al. |
| 5,337,087 A | 8/1994 | Mishima |
| 5,359,694 A | 10/1994 | Concordel |
| 5,379,072 A | 1/1995 | Kondo |
| 5,398,078 A | 3/1995 | Masuda et al. |
| 5,406,334 A | 4/1995 | Kondo et al. |
| 5,416,522 A | 5/1995 | Igarashi ..................... 348/416 |
| 5,416,651 A | 5/1995 | Uetake et al. |
| 5,416,847 A | 5/1995 | Boze |
| 5,429,403 A | 7/1995 | Andrew et al. |
| 5,434,716 A | 7/1995 | Sugiyama et al. |
| 5,438,369 A | 8/1995 | Citta et al. |
| 5,446,456 A | 8/1995 | Seo |
| 5,455,629 A | 10/1995 | Sun et al. |
| 5,469,216 A | 11/1995 | Takahashi et al. |
| 5,469,474 A | 11/1995 | Kitabatake |
| 5,471,501 A | 11/1995 | Parr et al. |
| 5,473,479 A | 12/1995 | Takahura |
| 5,481,554 A | 1/1996 | Kondo |
| 5,481,627 A | 1/1996 | Kim |
| 5,495,298 A | 2/1996 | Uchida et al. |
| 5,499,057 A | 3/1996 | Kondo et al. |
| 5,528,608 A | 6/1996 | Shimizume |
| 5,557,420 A | 9/1996 | Yanagihara et al. |
| 5,557,479 A | 9/1996 | Yanagihara |
| 5,577,053 A | 11/1996 | Dent |
| 5,583,573 A | 12/1996 | Asamura et al. |
| 5,594,807 A | 1/1997 | Liu |
| 5,598,214 A | 1/1997 | Kondo et al. |
| 5,617,333 A | 4/1997 | Oyamada et al. |
| 5,625,715 A | 4/1997 | Trew et al. |
| 5,636,316 A | 6/1997 | Oku et al. |
| 5,649,053 A | 7/1997 | Kim |
| 5,663,764 A | 9/1997 | Kondo et al. |
| 5,673,357 A | 9/1997 | Shima |
| 5,677,734 A | 10/1997 | Oikawa et al. |
| 5,689,302 A | 11/1997 | Jones |
| 5,699,475 A | 12/1997 | Oguro et al. |
| 5,703,889 A | 12/1997 | Shimoda et al. |
| 5,710,815 A | 1/1998 | Ming et al. ..................... 380/20 |
| 5,724,099 A | 3/1998 | Hamdi et al. |
| 5,724,369 A | 3/1998 | Brailean et al. |
| 5,737,022 A | 4/1998 | Yamaguchi et al. |
| 5,751,361 A | 5/1998 | Kim |
| 5,751,743 A | 5/1998 | Takazawa |
| 5,751,862 A | 5/1998 | Williams et al. |
| 5,751,865 A | 5/1998 | Micco et al. ................ 382/296 |
| 5,786,857 A | 7/1998 | Yamaguchi |
| 5,790,195 A | 8/1998 | Ohsawa |
| 5,796,786 A | 8/1998 | Lee |
| 5,805,762 A | 9/1998 | Boyce et al. |
| 5,809,231 A | 9/1998 | Yokoyama et al. |
| 5,812,146 A | 9/1998 | Sato et al. ..................... 345/501 |
| 5,841,781 A | 11/1998 | Takeda |
| 5,841,794 A | 11/1998 | Inoue et al. |
| 5,852,470 A | 12/1998 | Kondo et al. |
| 5,861,892 A | 1/1999 | Sato et al. ..................... 345/435 |
| 5,861,922 A | 1/1999 | Murashita et al. |
| 5,878,183 A | 3/1999 | Sugiyama et al. |
| 5,903,481 A | 5/1999 | Kondo et al. |
| 5,928,318 A | 7/1999 | Araki |
| 5,931,968 A | 8/1999 | Gray ......................... 714/806 |
| 5,936,674 A | 8/1999 | Kim |
| 5,940,411 A | 8/1999 | Takeda |
| 5,946,044 A | 8/1999 | Kondo et al. |
| 5,991,450 A | 11/1999 | Ohsawa et al. .............. 382/245 |
| 6,026,190 A | 2/2000 | Astle .......................... 382/232 |
| 6,049,612 A | 4/2000 | Fielder et al. ................. 380/44 |
| 6,067,636 A | 5/2000 | Yao et al. |
| 6,070,174 A * | 5/2000 | Starek et al. ................ 707/206 |
| 6,198,851 B1 | 3/2001 | Kato et al. ................... 382/248 |
| 6,229,929 B1 | 5/2001 | Lynch et al. ................. 382/268 |
| 6,377,955 B1 * | 4/2002 | Hartmann et al. ........... 707/104 |

FOREIGN PATENT DOCUMENTS

| | | | |
|---|---|---|---|
| EP | 0 527 611 | 8/1992 | ............ H04N/9/80 |
| EP | 0 558 016 | 2/1993 | .......... H04N/7/133 |
| EP | 0 566 412 A2 | 4/1993 | |
| EP | 0 571 180 A2 | 5/1993 | |
| EP | 0 592 196 A2 | 10/1993 | |
| EP | 0 596 826 | 11/1993 | ............ H04N/5/92 |
| EP | 0 605 209 A2 | 12/1993 | |
| EP | 0 610 587 | 12/1993 | |
| EP | 0 597 576 A | 5/1994 | |
| EP | 0 651 584 A2 | 10/1994 | |
| EP | 0 680 209 | 4/1995 | ............ H04N/5/91 |
| EP | 0 746 157 A2 | 5/1996 | |
| EP | 0 818 930 A2 | 7/1997 | ............ H04N/7/26 |
| EP | 806 872 A2 | 11/1997 | |
| EP | 0 851 679 A2 | 12/1997 | |
| EP | 0 833 517 | 4/1998 | ............ H04N/7/30 |
| GB | 2 320 836 A | 11/1997 | |
| JP | 7-67028 | 3/1995 | .......... H04N/5/235 |
| JP | 09200757 | 1/1996 | ............ H04N/7/30 |
| JP | 8-317394 | 11/1996 | |
| WO | WO96/07987 | 9/1995 | |
| WO | WO99/21285 | 10/1998 | |
| WO | 99 21090 A | 4/1999 | |
| WO | WO 99 21369 A | 4/1999 | |
| WO | WO 0101702 A1 | 1/2001 | |

OTHER PUBLICATIONS

Khan, JV. discloses Personal, Indoor and Mobile Radio Communications, 2000. PIMRC 2000. The 11th IEEE International Symposium on , vol.: 2, 2000–Page(s): 1022–1026 vol. 2.*

Meguro, et al., "An Adaptive Order Statistics Filter Based On Fuzzy Rules For Image Processing", pp. 70–80, XP–00755627, 1997 Scripta Technica, Inc.

Zhu, et al., "Coding and Cell–Loss Recovery in DCT–Based Packet Video", IEEE Transactions on Circuits and Systems for Video Technology, Jun. 3, 1993, No. 3, NY.

Stammnitz, et al., "Digital HDTV Experimental System", pp. 535–542.

Richard Brush, XP–002075974, "Video Data Shuffling For The 4:2:2 DVTR", SMPTE Journal Oct. 1996, pp. 1009–1016.

Chu, et al., Detection and Concealment of Transmission Errors in H.261 Images, XP–000737–27, pp. 74–84, IEEE transactions, Feb. 1998.

Park, et al., "Recovery of Block–coded Images from Channel Errors", pp. 396–400, pub. Date May 23, 1993.

Chan, et al., *Block Shuffling And Adaptive Interleaving For Still Image Transmission Over Rayleigh Fading Channels,* May 1999, vol. 48, IEEE Transactions on Vehicular Technology, pp. 1002–1011.

Kondo, et al., New ADRC for Consumer Digital VCR, p. 144–150, 1990, 8$^{th}$ International Conference; Video, Audio and Data Recording.

Calgar, et al., New Efficient Shuffled Block Transform Design Technique, Electronics Letters, vol. 30, No. 11, May 26, 1994.

King Ip Chan, et al., XP–002131882, "Block Shuffling On Top Of Error Concelment For Wireless Image Transmissions", pp. 977–981, 1996 IEEE.

Japanese Patent No. 05304659 and translation of Abstract.
Japanese Patent No. 05244578 and translation of Abstract.
Japanese Patent No. 05300485 and translation of Abstract.
Japanese Patent No. 06070298 and translation of Abstract.
Japanese Patent No. 06006778 and translation of Abstract.
Japanese Patent No. 06113256 and translation of Abstract.
Japanese Patent No. 06113275 and translation of Abstract.
Japanese Patent No. 06253287 and translation of Abstract.
Japanese Patent No. 06253280 and translation of Abstract.
Japanese Patent No. 06253284 and translation of Abstract.
Japanese Patent No. 06350981 and translation of Abstract.
Japanese Patent No. 06350982 and translation of Abstract.
Japanese Patent No. 08317394 and translation of Abstract.
Japanese Patent No. 07023388 and translation of Abstract.
Japanese Patent No. 04245881 and translation of Abstract.
Japanese Patent No. 04115628 and translation of Abstract.
Japanese Patent No. 04115686 and translation of Abstract.

Chan, et al., "Block Shuffling On Top Of Error Concealment For Wireless Image Transmissions", vol. 3, Oct. 15, 1996, pp. 977–981.

Huifang Sun, et al., "Error Concealment Algorithms For Robust Decoding of MPEG Compressed Video", Sep. 1, 1997, pp. 249–268.

Brush: "Video Data Shuffling For The 4:2:2 DVTR", Oct. 1, 1986, pp. 1009–1016.

Kondo, et al., "Adaptive Dynamic Range Coding Scheme For Future Consumer Digital VTR", pp. 219–226, Jan. 1, 1988.

Kim, et al., "Bit Rate Reduction Algorithm For A Digital VCR", IEEE Transactions on Consumer Electronics, vol. 37, No. 3, Aug. 1, 1992, pp. 267–274.

R.C. Gonzalez, et al., "Digital Image Processing", Addison Wesley Publishing Company, Inc., 1992, pp. 67–88.

R. Aravind, et al., "Image and Video Coding Standards", AT&T Technical Journal Jan./Feb. 1993, pp. 67–88.

Translation of Abstract of Japanese Patent No. 61147690.
Translation of Abstract of Japanese Patent No. 63256080.
Translation of Abstract of Japanese Patent No. 63257390.
Translation of Abstract of Japanese Patent No. 02194785.
Translation of Abstract of Japanese Patent No. 03024885.
Translation of Abstract of Japanese Patent No. 04037293.
Translation of Abstract of Japanese Patent No. 04316293.
Translation of Abstract of Japanese Patent No. 04329088.
Translation of Abstract of Japanese Patent No. 05047116.
Translation of Abstract of Japanese Patent No. 05244579.
Translation of Abstract of Japanese Patent No. 05244580.
Translation of Abstract of Japanese Patent No. 05244559.
Translation of Abstract of Japanese Patent No. 05304659.
Translation of Abstract of Japanese Patent No. 06086259.
Translation of Abstract of Japanese Patent No. 06113258.
Translation of Abstract of Japanese Patent No. 06125534.
Translation of Abstract of Japanese Patent No. 06162693.
Translation of Abstract of Japanese Patent No. 06253287.
Translation of Abstract of Japanese Patent No. 06253280.
Translation of Abstract of Japanese Patent No. 06253284.
Translation of Abstract of Japanese Patent No. 07046604.
Translation of Abstract of Japanese Patent No. 07085611.
Translation of Abstract of Japanese Patent No. 07095581.
Translation of Abstract of Japanese Patent No. 07177505.
Translation of Abstract of Japanese Patent No. 07177506.
Translation of Abstract of Japanese Patent No. 07240903.

Kondo,et al., "Adaptive Dynamic Range Coding Scheme For Future HDTV Digital VTR", Fourth International Workshop on HDTV and Beyond, Sep. 4–6, 1991, Turin, Italy, pp. 43–50.

Kondo,et al., "A New Concealment Method For Digital VCR's", IEEE Visual Signal Processing and Communication, pp. 20–22, 9/93, Melbourne, australia.

Park, et al., "A Simple Concealment For ATM Bursty Cell Loss", IEEE transactions of Consumer Electroncis, No. 3, Aug. 1993, pp. 704–709.

Tom, et al., "Packet Video for Cell Loss Protection Using Deinterleaving and Scrambling", ICASSP 91: 1991 International conference on Acoustics, Speech and Signal Processing, vol. 4, pp. 257–2860, Apr. 1991.

NHK Laboratories Note,"Error Correction, Concealment and Shuffling", No. 424, Mar. 1994, pp. 29–44.

Translation of Japanese Patent #7–67028, 30 pgs.

Jeng, et al., "Concealment Of Bit Error And Cell Loss In Inter–Frame Coded Video Transmission", 1991 IEEE, 17.4.1–17.4.5.

Monet, et al., "Block Adaptive Quantization Of Images", IEEE 1993, pp. 303–306.

Huifang Sun, et al., "Error Concealment Algorithms For Robust Decoding of MPEG Compressed Video", Sep. 1, 1997, pp. 249–268.

Brush: "Video Data Shuffling For The 4:2:2 DVTR", Oct. 1, 1986, pp. 1009–1016.

Japanese Abstract Translation 2–194785.
Japanese Abstract Translation 3–024885.
Japanese Abstract Translation 4–037293.
Japanese Abstract Translation 4–316293.

Japanese Abstract Translation 4–329088.
Japanese Abstract Translation 5–047116.
Japanese Abstract Translation 5–244559.
Japanese Abstract Translation 5–244579.
Japanese Abstract Translation 5–244580.
Japanese Abstract Translation 6–086259.
Japanese Abstract Translation 6–113258.
Japanese Abstract Translation 6–1147690.
Japanese Abstract Translation 6–125534.
Japanese Abstract Translation 6–162693.
Japanese Abstract Translation 6–3256080.
Japanese Abstract Translation 6–3257390.
Japanese Abstract Translation 7–046604.
Japanese Abstract Translation 7–085611.
Japanese Abstract Translation 7–095581.
Japanese Abstract Translation 7–177505.
Japanese Abstract Translation 7–177506.
Japanese Abstract Translation 7–240903.
Japanese Patent & Abstract Trans. 6–070298.
Japanese Patent & Abstract Trans. 6–006778.
Japanese Patent & Abstract Trans. 6–113256.
Japanese Patent & Abstract Trans. 6–113275.
Japanese Patent & Abstract Trans. 6–253287.
Japanese Patent & Abstract Trans. 6–253280.
Japanese Patent & Abstract Trans. 6–253284.
Japanese Patent & Abstract Trans. 6–350981.
Japanese Patent & Abstract Trans. 6–350982.

* cited by examiner

IMAGE 560

IMAGE 570

INTRA FRAME-SET BLOCK SHUFFLING
SEGMENT DEFINITION: Y-BLOCKS

INTRA GROUP VL-DATA SHUFFLING BIT RE-ALLOCATION

TABLE 122:

| Q0 | Q1 | Q2 | Q3 | Q4 | Q5 | Q6 | Q7 |
|---|---|---|---|---|---|---|---|
| Q8 | Q9 | Q10 | Q11 | Q12 | Q13 | Q14 | Q15 |
| Q16 | Q17 | Q18 | Q19 | Q20 | Q21 | Q22 | Q23 |
| Q24 | Q25 | Q26 | Q27 | Q28 | Q29 | Q30 | Q31 |
| Q32 | Q33 | Q34 | Q35 | Q36 | Q37 | Q38 | Q39 |
| Q40 | Q41 | Q42 | Q43 | Q44 | Q45 | Q46 | Q47 |
| Q48 | Q49 | Q50 | Q51 | Q52 | Q53 | Q54 | Q55 |
| Q56 | Q57 | Q58 | Q59 | Q60 | Q61 | Q62 | Q63 |

CODES OF CONCATENATED ADRC TILE A

TABLE 132:

| Q0 | Q6 | Q12 | Q18 | Q24 | Q30 | Q36 | Q42 |
|---|---|---|---|---|---|---|---|
| Q48 | Q54 | Q60 | Q1 | Q7 | Q13 | Q19 | Q25 |
| Q31 | Q37 | Q43 | Q49 | Q55 | Q61 | Q2 | Q8 |
| Q14 | Q20 | Q26 | Q32 | Q38 | Q44 | Q50 | Q56 |
| Q62 | Q3 | Q9 | Q15 | Q21 | Q27 | Q33 | Q39 |
| Q45 | Q51 | Q57 | Q63 | Q4 | Q10 | Q16 | Q22 |
| Q28 | Q34 | Q40 | Q46 | Q52 | Q58 | Q5 | Q11 |
| Q17 | Q23 | Q29 | Q35 | Q41 | Q47 | Q53 | Q59 |

SPATIALLY DISTRIBUTED CODES

BITSTREAM 130: Q0 BITS Q6 BITS Q12 BITS Q18 BITS Q24 BITS Q30 BITS Q36 BITS Q42 BITS Q48 BITS ... Q59 BITS

BITSTREAM 140

BIT# 0 1 2 3 4 5 6 ....

FIG. 12A

INTER SEGMENT FL-DATA SHUFFLING

ORIGNAL

| | ←—FL-DATA—→ | | | ←—VL-DATA—→ |
|---|---|---|---|---|
| SEGMENT 0 | DR | Motion Flag | MIN | |
| SEGMENT 1 | DR | Motion Flag | MIN | |
| SEGMENT 2 | DR | Motion Flag | MIN | |
| SEGMENT 3 | DR | Motion Flag | MIN | |
| SEGMENT 4 | DR | Motion Flag | MIN | |
| SEGMENT 5 | DR | Motion Flag | MIN | |

MIN Shuffling 1300

| | ←—FL-DATA—→ | ←—VL-DATA—→ |
|---|---|---|
| SEGMENT 0 | MIN | |
| SEGMENT 1 | MIN | |
| SEGMENT 2 | MIN | |
| SEGMENT 3 | MIN | |
| SEGMENT 4 | MIN | |
| SEGMENT 5 | MIN | |

| Original | Shuffled |
|---|---|
| Segment 0 --> | Segment 2 |
| Segment 2 --> | Segment 4 |
| Segment 4 --> | Segment 0 |
| Segment 1 --> | Segment 3 |
| Segment 3 --> | Segment 5 |
| Segment 5 --> | Segment 1 |

FIG. 13

| BLOCK # | 0 | 1 | 2 | 3 | 4 | 5 | 6 | 7 | 8 | ...879 |
|---|---|---|---|---|---|---|---|---|---|---|
| COUNT | 0 | 1 | 2 | 0 | 1 | 2 | 0 | 1 | 2 | ... |
| SEGMENT A | ◇ | ◇ | ◇ | ◇ | ◇ | ◇ | ◇ | ◇ | ◇ | ... |
| SEGMENT B | ○ | ○ | ○ | ○ | ○ | ○ | ○ | ○ | ○ | ... |
| SEGMENT C | □ | □ | □ | □ | □ | □ | □ | □ | □ | ... |

DR MODULAR SHUFFLE 1410

| BLOCK # | 0 | 1 | 2 | 3 | 4 | 5 | 6 | 7 | 8 | ...879 |
|---|---|---|---|---|---|---|---|---|---|---|
| COUNT | 0 | 1 | 2 | 0 | 1 | 2 | 0 | 1 | 2 | ... |
| SEGMENT A | ◇ | ◇ | ◇ | ◇ | ◇ | ◇ | ◇ | ◇ | ◇ | ... |
| SEGMENT B | ○ | ○ | ○ | ○ | ○ | ○ | ○ | ○ | ○ | ... |
| SEGMENT C | □ | □ | □ | □ | □ | □ | □ | □ | □ | ... |

MIN MODULAR SHUFFLE 1420

| BLOCK # | 0 | 1 | 2 | 3 | 4 | 5 | 6 | 7 | 8 | ...879 |
|---|---|---|---|---|---|---|---|---|---|---|
| COUNT | 0 | 1 | 2 | 0 | 1 | 2 | 0 | 1 | 2 | ... |
| SEGMENT A | ◇ | ◇ | ◇ | ◇ | ◇ | ◇ | ◇ | ◇ | ◇ | ... |
| SEGMENT B | ○ | ○ | ○ | ○ | ○ | ○ | ○ | ○ | ○ | ... |
| SEGMENT C | □ | □ | □ | □ | □ | □ | □ | □ | □ | ... |

MOTION FLAG MODULAR SHUFFLE 1430

FIG. 14

BLOCK#

| COUNT | 0 | 1 | 2 | 3 | 4 | 5 | ••• | 879 |
|---|---|---|---|---|---|---|---|---|
|  | 0 | 1 | 2 | 0 | 1 | 2 | ••• |  |
| DATA |  |  |  |  |  |  |  |  |
| DR | 0 | 2 | 4 | 0 | 2 | 4 | ••• |  |
| MIN | 2 | 4 | 0 | 2 | 4 | 0 | ••• |  |
| M | 4 | 0 | 2 | 4 | 0 | 2 | ••• |  |

MODULAR SHUFFLE RESULT 1416

BLOCK#

| | | 0 | 1 | 2 | 3 | 4 | 5 | ••• | 879 |
|---|---|---|---|---|---|---|---|---|---|
| COUNT | | 0 | 1 | 2 | 0 | 1 | 2 | ••• | |
| SEGMENT# | | | | | | | | | |
| | 0 | DR | M | MIN | DR | M | MIN | ••• | |
| | 1 | | | | | | | ••• | |
| | 2 | MIN | DR | M | MIN | DR | M | ••• | |
| | 3 | | | | | | | ••• | |
| | 4 | M | MIN | DR | M | MIN | DR | ••• | |
| | 5 | | | | | | | | |

LOSS PATTERN 1415

| DR |  | MIN |  | M |  | DR |  | MIN |  | M |  |
|---|---|---|---|---|---|---|---|---|---|---|---|
|  | M |  | DR |  | MIN |  | M |  | DR |  | MIN |
| DR |  | MIN |  | M |  | DR |  | MIN |  | M |  |
|  | M |  | DR |  | MIN |  | M |  | DR |  | MIN |
| DR |  | MIN |  | M |  | DR |  | MIN |  | M |  |
|  | M |  | DR |  | MIN |  | M |  | DR |  | MIN |
| DR |  | MIN |  | M |  | DR |  | MIN |  | M |  |
|  | M |  | DR |  | MIN |  | M |  | DR |  | MIN |
| DR |  | MIN |  | M |  | DR |  | MIN |  | M |  |
|  | M |  | DR |  | MIN |  | M |  | DR |  | MIN |

SPATIAL LOSS PATTERN 1417

FIG. 14A

| BLOCK# COUNT | 0 | 1 | 2 | 3 | 4 | 5 | 6 | 7 | • • • | 879 |
|---|---|---|---|---|---|---|---|---|---|---|
| DATA | 0 | 1 | 2 | 3 | 4 | 5 | 0 | 1 | • • • | |
| DR | 0 | 1 | 2 | 3 | 4 | 5 | 0 | 1 | • • • | |
| MIN | 2 | 3 | 4 | 5 | 0 | 1 | 2 | 3 | • • • | |
| M | 4 | 5 | 0 | 1 | 2 | 3 | 4 | 5 | • • • | |

MODULAR SHUFFLE RESULT 1421

| BLOCK# COUNT | 0 | 1 | 2 | 3 | 4 | 5 | 6 | 7 | • • • | 879 |
|---|---|---|---|---|---|---|---|---|---|---|
| SEGMENT# | 0 | 1 | 2 | 3 | 4 | 5 | 0 | 1 | • • • | |
| 0 | DR |  | M |  | MIN |  | DR |  | • • • | |
| 1 |  | DR |  | M |  | MIN |  | DR | • • • | |
| 2 | MIN |  | DR |  | M |  | MIN |  | • • • | |
| 3 |  | MIN |  | DR |  | M |  | MIN | • • • | |
| 4 | M |  | MIN |  | DR |  | M |  | • • • | |
| 5 |  | M |  | MIN |  | DR |  | M | • • • | |

LOSS PATTERN 1420

FIG. 14B

Modular Shuffle Result 1426

| BLOCK# COUNT | 0 | 1 | 2 | 3 | 4 | 5 | 6 | 7 | • • • 879 |
|---|---|---|---|---|---|---|---|---|---|
| | 0 | 1 | 2 | 3 | 4 | 5 | 0 | 1 | • • • |
| DATA DR | 0 | 1 | 2 | 3 | 4 | 5 | 0 | 1 | • • • |
| MIN | 0 | 1 | 2 | 3 | 4 | 5 | 0 | 1 | • • • |
| M | 0 | 1 | 2 | 3 | 4 | 5 | 0 | 1 | • • • |

MODULAR SHUFFLE RESULT 1426

Loss Pattern 1425

| BLOCK# COUNT | 0 | 1 | 2 | 3 | 4 | 5 | 6 | 7 | • • • 879 |
|---|---|---|---|---|---|---|---|---|---|
| | 0 | 1 | 2 | 3 | 4 | 5 | 0 | 1 | • • • |
| SEGMENT# 0 | D,M,MIN | | | | | | D,M,MIN | | • • • |
| 1 | | D,M,MIN | | | | | | D,M,MIN | • • • |
| 2 | | | D,M,MIN | | | | | | • • • |
| 3 | | | | D,M,MIN | | | | | • • • |
| 4 | | | | | D,M,MIN | | | | • • • |
| 5 | | | | | | D,M,MIN | | | • • • |

LOSS PATTERN 1425

D: DR
M: MOTION FLAG

TIME-VARYING RANDOMIZATION FOR DATA SYNCHRONIZATION AND IMPLICIT INFORMATION TRANSMISSION

The present patent application is a Divisional of prior application Ser. No. 09/342,275, filed Jun. 29, 1999 entitled TIME-VARYING RANDOMIZATION FOR DATA SYNCHRONIZATION AND IMPLICIT INFORMATION TRANSMISSION.

BACKGROUND OF THE INVENTION

1. Field of the Invention The present invention relates to providing a robust error recovery due to data losses incurred during transmission of signals. More particularly, the present invention relates to a method of time-varying randomization of data used in facilitating a robust error recovery.

2. Art Background

A number of techniques exist for reconstructing lost data due to random errors that occur during signal transmission or storage. However, these techniques cannot handle the loss of consecutive packets of data. Consecutive loss of packets of data is described in the art as burst error. Burst errors result in a reconstructed signal with such a degraded quality that it is easily apparent to the end user. Additionally, compression methodologies used to facilitate high speed communications compound the signal degradation caused by burst errors, thus adding to the degradation of the reconstructed signal. Examples of burst error loss affecting transmitted and/or stored signals may be seen in high definition television ("HDTV") signals, mobile telecommunication applications, as well as video storage technologies including video disk and VCRs.

For example, the advent of HDTV has led to television systems with a much higher resolution than the current standards proposed by the National Television Systems Committee ("NTSC"). Proposed HDTV signals are predominantly digital. Accordingly, when a color television signal is converted for digital use it is common that the luminance and chrominance signals may be digitized using eight bits. Digital transmission of NTSC color television signals may require a nominal bit rate of about two-hundred and sixteen megabits per second. The transmission rate is greater for HDTV, which may nominally require about 1200 megabits per second. Such high transmission rates may be well beyond the bandwidths supported by current wireless standards. Accordingly, an efficient compression methodology is required.

Compression methodologies also play an important role in mobile telecommunication applications. Typically, packets of data are communicated between remote terminals in mobile telecommunication applications. The limited number of transmission channels in mobile communications requires an effective compression methodology prior to the transmission of packets. A number of compression techniques are available to facilitate high transmission rates.

Adaptive Dynamic Range Coding ("ADRC") and Discrete Cosine Transform ("DCT") coding provide image compression techniques known in the art. Both techniques take advantage of the local correlation within an image to achieve a high compression ratio. However, an efficient compression algorithm may result in compounded error propagation because errors in an encoded signal are more prominent when subsequently decoded. This error multiplication may result in a degraded video image that is readily apparent to the user.

SUMMARY OF THE INVENTION

The present invention includes a system and method to encode data to maximize subsequent recovery of lost or damaged encoded data. In one embodiment, a current block of data is randomized in accordance with data from the current block and data from at least one temporally adjacent block of data. In one embodiment, randomized data is derandomized using the current block of data and data from at least one temporally adjacent block. In addition, in one embodiment, decoding of the current block and the adjacent block is delayed in order to facilitate recovery of lost or damaged compression parameters of encoded data.

BRIEF DESCRIPTION OF THE DRAWINGS

The objects, features and advantages of the present invention will be apparent to one skilled in the art in light of the following detailed description in which:

FIG. 12a illustrates one embodiment of shuffling Q codes and distributing Q code bits.

FIG. 13 illustrates one embodiment of MIN shuffling.

FIG. 14 illustrates one embodiment of a modular shuffling.

FIG. 14a illustrates one embodiment of a modular shuffling result and the fixed length data loss associated with the modular shuffling.

FIG. 14b illustrates an alternate embodiment of a modular shuffling result and the fixed length data loss associated with the modular shuffling.

FIG. 14c illustrates an alternate embodiment of a modular shuffling result and the fixed length data loss associated with the modular shuffling.

DETAILED DESCRIPTION

Figure 1A:
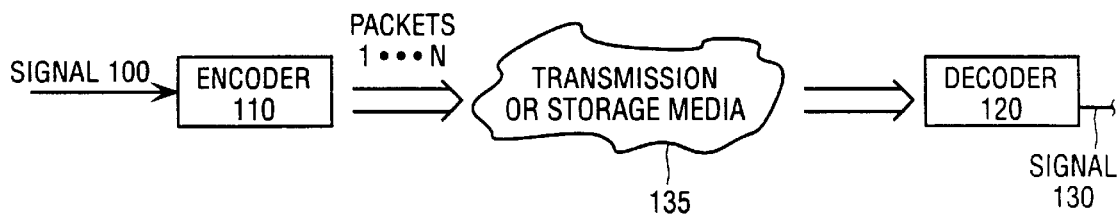
FIG. 1a illustrates an embodiment of the processes of signal encoding, transmission, and decoding.

The present invention provides a system and method for the time-varying randomization of a signal stream to provide for a robust error recovery. In addition, the present invention provides a system and method for time-varying derandomization of a randomized signal stream and alternately delayed-decoding of the signal stream. In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

The signal processing methods and structures are described in the context of one embodiment in which the signals are Adaptive Dynamic Range Coding (ADRC) encoded images, and more particularly to the recovery of lost or damaged (lost/damaged) compression constants such as dynamic range (DR) and minimum value (MIN). However, it is contemplated that the present invention is not limited to ADRC encoding and the particular compression constants generated; rather it will be apparent that the present invention is applicable to different compression technologies, different types of correlated data, including, but not limited to, sound data and the like, and different compression constants including, but not limited to, the maximum value (MAX) and central value (CEN) which may be used in ADRC processes. In addition, the present invention is applicable to different types of ADRC processes including edge-matching and non edge-matching ADRC. For further information regarding ADRC, see "Adaptive Dynamic Range Coding Scheme for Future HDTV Digital VTR", Kondo, Fujimori, Nakaya, Fourth International Workshop on HDTV and Beyond, Sep. 4–6, 1991, Turin, Italy. ADRC has been established as a feasible real-time technique for coding and compressing images in preparation for constant bit-rate transmission.

In the above paper, three different kinds of ADRC are explained. These are achieved according to the following equations:

Non-edge-matching ADRC:

$$DR = MAX - MIN + 1$$

$$q = \left\lfloor \frac{(x - MIN + 0.5) \cdot 2^Q}{DR} \right\rfloor$$

-continued $$x' = \left\lfloor \frac{(q + 0.5) \cdot DR}{2^Q} + MIN \right\rfloor$$

Edge-matching ADRC:

$$DR = MAX - MIN$$

$$q = \left\lfloor \frac{(x - MIN) \cdot (2^Q - 1)}{DR} + 0.5 \right\rfloor$$

$$x' = \left\lfloor \frac{q \cdot DR}{2^Q - 1} + MIN + 0.5 \right\rfloor$$

Multi-stage ADRC:

$$DR = MAX - MIN + 1$$

$$q = \left\lfloor \frac{(x - MIN + 0.5) \cdot 2^Q}{DR} \right\rfloor$$

$$x' = \left\lfloor \frac{(q + 0.5) \cdot DR}{2^Q} + MIN \right\rfloor$$

Where MAX' is the averaged value of x' in the case of $q=2^Q-1$;

MIN' is the averaged value of x' in the case of q=0; and $$DR' = MAX' - MIN'$$

$$q = \left\lfloor \frac{(x - MIN') \cdot (2^Q - 1)}{DR'} + 0.5 \right\rfloor$$

$$x' = \left\lfloor \frac{q \cdot DR'}{2^Q - 1} + MIN' + 0.5 \right\rfloor$$

where MAX represents the maximum level of a block, MIN represents the minimum level of a block, x represents the signal level of each sample, Q represents the number of quantization bits, q represents the quantization code (encoded data), x' represents the decoded level of each sample, and the square brackets $\lfloor \cdot \rfloor$ represent a truncation operation performed on the value within the square brackets.

The signal encoding, transmission, and subsequent decoding processes are generally illustrated in FIG. 1a. Signal 100 is a data stream input to Encoder 110. Encoder 110 follows the Adaptive Dynamic Range Coding ("ADRC") compression algorithm and generates Packets 1, . . . N for transmission along Transmission Media 135. Decoder 120 receives Packets 1, . . . N from Transmission Media 135 and generates Signal 130. Signal 130 is a reconstruction of Signal 100.

Figure 1B:
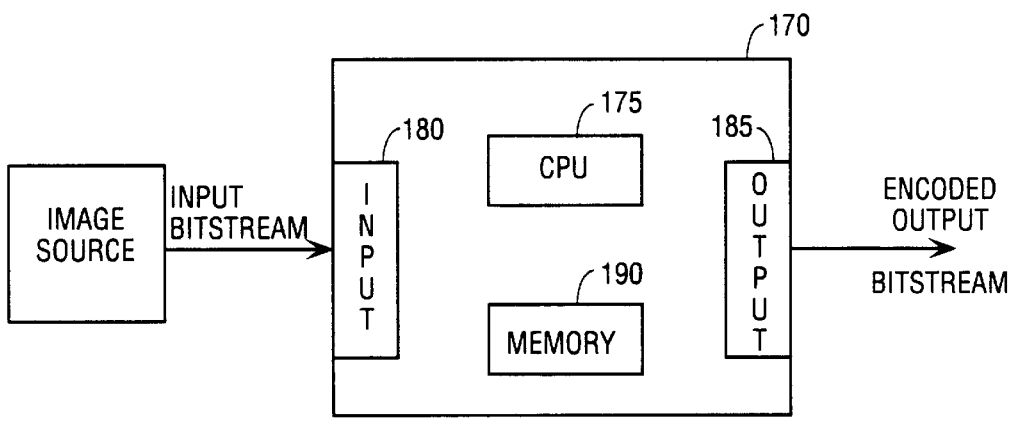
FIGS. 1b and 1c illustrate embodiments of signal encoding, transmission, and decoding implemented as software executed by a processor.
Figure 1C:
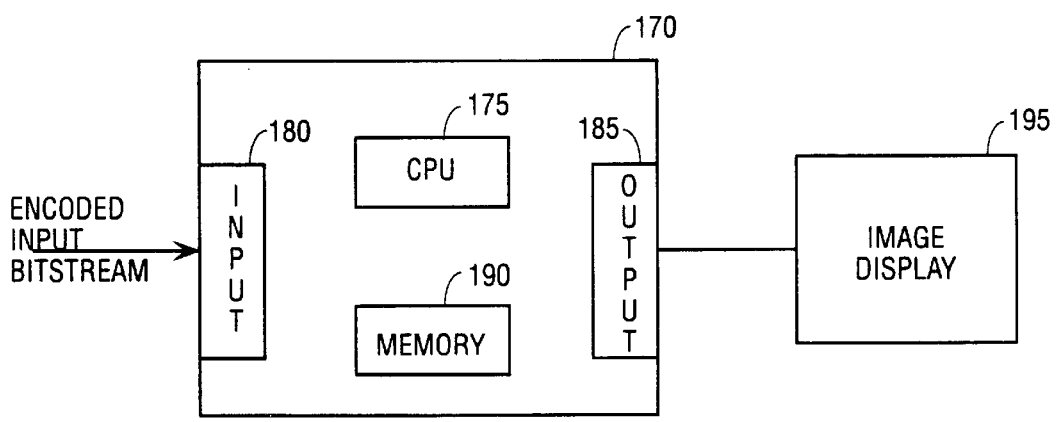
Figure 1D:
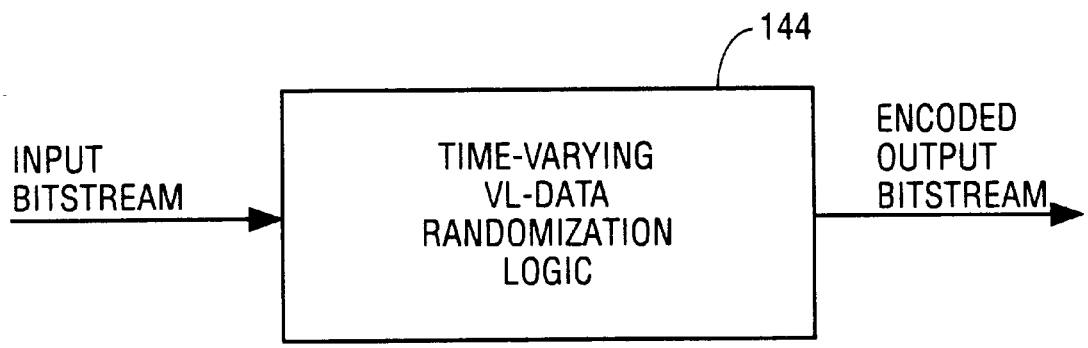
FIGS. 1d and 1e illustrate embodiments of signal encoding, transmission, and decoding implemented as hardware logic.
Figure 1E:
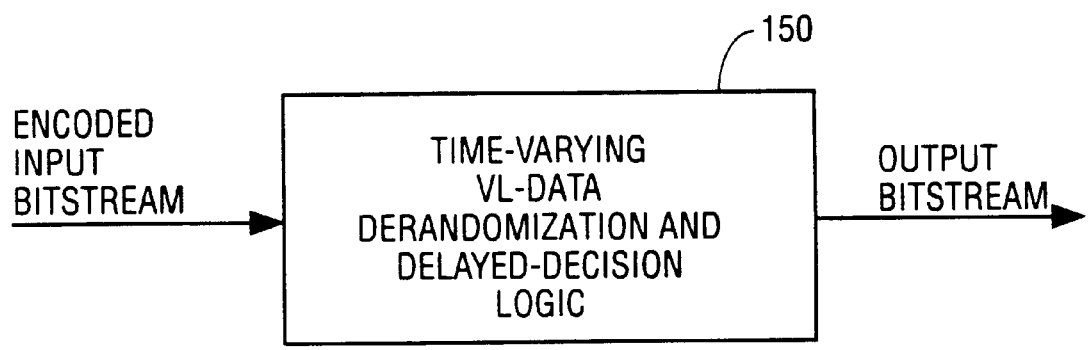

Encoder 110 and Decoder 120 can be implemented a variety of ways to perform the functionality described herein. In one embodiment, Encoder 110 and/or Decoder 120 may be embodied as software stored on media and executed by a general purpose or specifically configured computer system, typically including a central processing unit, memory and one or more input/output devices and co-processors, as shown in FIGS. 1b and 1c. Alternately, the Encoder 110 and/or Decoder 120 may be implemented as logic to perform the functionality described herein, as shown in FIGS. 1d and 1e. In addition, Encoder 110 and/or Decoder 120 can be implemented as a combination of hardware, software or firmware.

Embodiments of the circuits for coding, arranging, and the time-varying randomization of a signal stream to provide for a robust error recovery are shown in FIGS. 1b and 1c.

The methods described herein may be implemented on a specially configured or general purpose processor system 170. Instructions are stored in memory 190 and accessed by processor 175 to perform many of the steps described herein. Input 180 receives the input bitstream and forwards the data to processor 175. Output 185 outputs the data. In FIG. 1b, the output may consist of the encoded data. In FIG. 1c, the output may consist of the decoded data, such as image data decoded according to the methods described, sufficient to drive an external device such as display 195.

In one embodiment, Signal 100 may be a color video image comprising a sequence of video frames, each frame including information representative of an image in an interlaced video system. Each frame is composed of two fields, wherein one field contains data of the even lines of the image and the other field containing the odd lines of the image. The data includes pixel values that describe the color components of a corresponding location in the image. For example, in the present embodiment, the color components consist of the luminance signal Y, and color difference signals U, and V. It is readily apparent that the process of the present invention can be applied to signals other than interlaced video signals. Furthermore, it is apparent that the present invention is not limited to implementations in the Y, U, V color space, but can be applied to images represented in other color spaces.

In alternate embodiments, Signal 100 may be, for example, two-dimensional static images, hologram images, three-dimensional static images, video, two-dimensional moving images, three dimensional moving images, monaural sound, or N-channel sound.

Referring back to FIG. 1a, Encoder 110 divides the Y, U, and V signals and processes each group of signals independently in accordance with the ADRC algorithm. The following description, for purposes of simplifying the discussion, -describes the processing of the Y signal; however, the encoding steps may be replicated for the U and V signals.

In one embodiment, Encoder 110 groups Y signals across two subsequent frames, referred to herein as a frame pair, of Signal 100 into three dimensional blocks ("3 D") blocks. In an alternate embodiment, a 3 D block is generated from grouping two 2 D blocks from the same localized area across a given frame pair, wherein a two dimensional 2 D block is created by grouping localized pixels within a frame or a field. It is contemplated that the process described herein can be applied to different block structures. The grouping of signals will be further described in the image-to-block mapping section below.

In one embodiment, for a given 3 D block, Encoder 110 calculates whether there is a change in pixel values between the 2 D blocks forming the 3 D block. A Motion Flag is set if there are substantial changes in values. As is known in the art, use of a Motion Flag allows Encoder 110 to reduce the number of quantization codes when there is localized image repetition within each frame pair. Encoder 110 also detects the maximum pixel intensity value ("MAX") and the minimum pixel intensity value ("MIN") within a 3 D block. Using values MAX and MIN, Encoder 110 calculates the dynamic range ("DR") for a given 3 D block of data. For one embodiment DR =MAX−MN+1 in the case of non-edge-matching ADRC. For edge-matching ADRC, DR=MAX−MIN. In some embodiments the encoder may also determine a central value (CEN) that has a value between MAX and MIN. In one embodiment, CEN may be determined as CEN=MIN+DR/2.

In an alternative embodiment, Encoder 110 encodes signals on a frame by frame basis for a stream of frames representing a sequence of video frames. In another embodiment, Encoder 110 encodes signals on a field by field basis for a stream of fields representing a sequence of video fields. Accordingly, Motion Flags are not used and 2 D blocks may be used to calculate the MIN, MAX, CEN and DR values.

In one embodiment, Encoder 110 references the calculated DR against a threshold table of DR threshold values and corresponding Qbit values to determine the number of quantization bits ("Qbits") used to encode pixels within the block corresponding to the DR. Encoding of a pixel results in a quantization code ("Q code"). The Q codes are the relevant compressed image data used for storage or transmission purposes.

In one embodiment, the Qbit selection is derived from the DR of a 3 D block. Accordingly, all pixels within a given 3 D block are encoded using the same Qbit, resulting in a 3 D encoded block. The collection of Q codes, MIN, Motion Flag, and DR for a 3 D encoded block is referred to as a 3 D ADRC block. Alternately, 2 D blocks are encoded and the collection of Q codes, MIN, and DR for a given 2 D block results in 2 D ADRC blocks. As noted earlier, the MAX value and CEN value may be used in place of the MIN value.

A number of threshold tables can be implemented. In one embodiment, the threshold table consists of a row of DR threshold values. A Qbit corresponds to the number of quantization bits used to encode a range of DR values between two adjacent DRs within a row of the threshold table. In an alternative embodiment, the threshold table includes multiple rows and selection of a row depends on the desired transmission rate. Each row in the threshold table is identified by a threshold index. A detailed description of one embodiment of threshold selection is described below in the discussion of partial buffering. A further description of an example of ADRC encoding and buffering is disclosed in U.S. Pat. No. 4,722,003 entitled "High Efficiency Coding Apparatus" and U.S. Pat. No. 4,845,560 also entitled "High Efficiency Coding Apparatus", assigned to the assignee of the present invention.

Here forth the Q codes are referred to as variable length data ("VL-data"). In addition, the DR, MIN, MAX, CEN and Motion Flag are referred to as block attributes. Selected block attributes, together with the threshold index, constitute the fixed length data ("FL-data"), also referred to herein as compression parameters. Furthermore, in view of the above discussion, the term block attribute describes a parameter associated with a component of a signal element, wherein a signal element includes multiple components.

An advantage of not including the Qbit code value in the FL-data is that no additional bits are need be transmitted for each ADRC block. A disadvantage of not including the Qbit value is that, if the DR is lost or damaged during transmission or storage, the Q codes cannot be easily recovered. The ADRC decoder must determine how many bits were used to quantize the block without relying on any DR information.

However, in one embodiment, the Qbit value may be sent implicitly by time-varying randomization of the VL-data. In one embodiment, the Qbit value of a current block of data, together with the Qbit values of a number of previous blocks, may be used as a randomizing or seed value for a pseudorandom number generator (PNG). In one embodiment, the three previous Qbit values may be used. However, any number of temporally adjacent values (either prior or subsequent) may be used to generate the seed value. For purposes of discussion herein, temporally adjacent may be construed to include any prior or subsequent block of data.

In one embodiment, each successive Qbit value is concatenated to the right of the current seed value. The PNG creates a statistically distinct pseudorandom number sequence for a unique seed value and creates the same statistically distinct sequence for each application of the same seed value. The pseudorandom number sequence may then be used to transform the VL-data. In alternate embodiments, the FL-data may be transformed or both the VL-data and FL-data may be transformed. In one embodiment, the transformation T of the VL-data is achieved by applying a bitwise XOR (exclusive OR) function to the pseudorandom number sequence (y) and the VL-data (x). Thus:

$$T(x)=x \oplus y.$$

In this embodiment, the bitwise XOR function is used, as the inverse transformation is exactly the same as for the original, forward transformation. That is:

$$T^{-1}(T(x))=(x \oplus y) \oplus y=x.$$

In alternate embodiments, a variety of sets of transformations may be used to generate the statistically distinct sequences. For example, a table of pre-defined sequences may be used.

In one embodiment, a similar process may be used to decode the Qbit value from the DR of the current block. If the DR arrives undamaged, the Qbit value may be determined by using the threshold table as was used for the Q code encoding. The DR is used to look-up the Qbit value in the table and the Qbit value is then used as a seed value to the PNG to produce the pseudorandom number sequence. The decoder transforms the randomized VL-data by applying a bitwise XOR function to the pseudorandom number sequence and the randomized VL-data to produce the original, non-randomized VL-data. In this embodiment, because the same PNG and seed value are used, the same pseudorandom number sequence is produced.

In one embodiment, if the DR is damaged or lost, the decoder attempts to decode the block with all possible Qbit values and associated possible seed values. A local correlation metric is applied to each candidate decoding, and a confidence metric is computed for the block.

In this embodiment, the decoder implements a delayed-decision decoder that delays the dequantization by four blocks. In one embodiment, if the decoder calculates four consecutive low confidence metrics, it may conclude that the decoding of the oldest block was incorrect. The decoder may then return to the candidate seed value used for the oldest block and try the next-most-likely decoding of the oldest block. The decoder may then re-derandomize the three most recent blocks using a second guess at a seed value. This process may continue until the decoder produces a sequence of four decoded blocks in which the most recent block's confidence metric is large.

Thus, in one embodiment, the Qbit value may be implicitly transmitted by means of the time-varying randomization. In alternate embodiments, any data may be implicitly transmitted. For example, the Motion Flag or a combination of the Qbit value and the Motion Flag may be used to generate the pseudorandom number sequence and, thus, be implicitly transmitted.

One embodiment of a circuit for coding, arranging, and the time-varying randomization of a signal stream to provide for a robust error recovery is shown in FIG. 1d. An input signal is received and time-varying VL-data randomization logic 144 generates randomized Q codes from the encoded and shuffled data. The output from the time-varying VL-data randomization logic 144 may be further encoded as discussed herein.

FIG. 1e illustrates an embodiment of a circuit for recovering lost or damaged DR values. An input signal is received and time-varying VL-data derandomization logic 150 derandomizes the Q codes from the input bitstream and recovers lost or damaged dynamic range constants. The output signal from the time-varying VL-data derandomization logic 150 may be further decoded and deshuffled as described herein.

Frames, block attributes, and VL-data describe a variety of components within a video signal. The boundaries, location, and quantity of these components are dependent on the transmission and compression properties of a video signal. In one embodiment, these components are varied, shuffled, and randomized within a bitstream of the video signal to ensure a robust error recovery during transmission losses.

For illustrative purposes, the following description provides for a ⅙ consecutive packet transmission loss tolerance, pursuant to an ADRC encoding and shuffling of a video signal. Accordingly, the following definition and division of components exist for one embodiment. Other embodiments also are contemplated. A data set may include a partition of data of a video or other type of data signal. Tuns, in one embodiment, a frame set may be a type of data set that includes one or more consecutive frames. A segment may include a memory with the capacity to store a one-sixth division of the Q codes and block attributes included in a frame set. Further, a buffer may include a memory with the capacity to store a one-sixtieth division of the Q codes and block attributes included in a frame set. The shuffling of data may be performed by interchanging components within segments and/or buffers. Subsequently, the data stored in a segment may be used to generate packets of data for transmission. Thus, in the following description, if a segment is lost all the packets generated from the segment are lost during transmission. Similarly, if a fraction of a segment is lost then a corresponding number of packets generated from the segment are lost during transmission.

Although, the following description refers to a ⅙ consecutive packet loss for data encoded using ADRC encoding, it is contemplated that the methods and apparatus described herein are applicable to a design of a 1/n consecutive packets loss tolerance coupled to a variety of encoding/decoding schemes.

Figure 2:
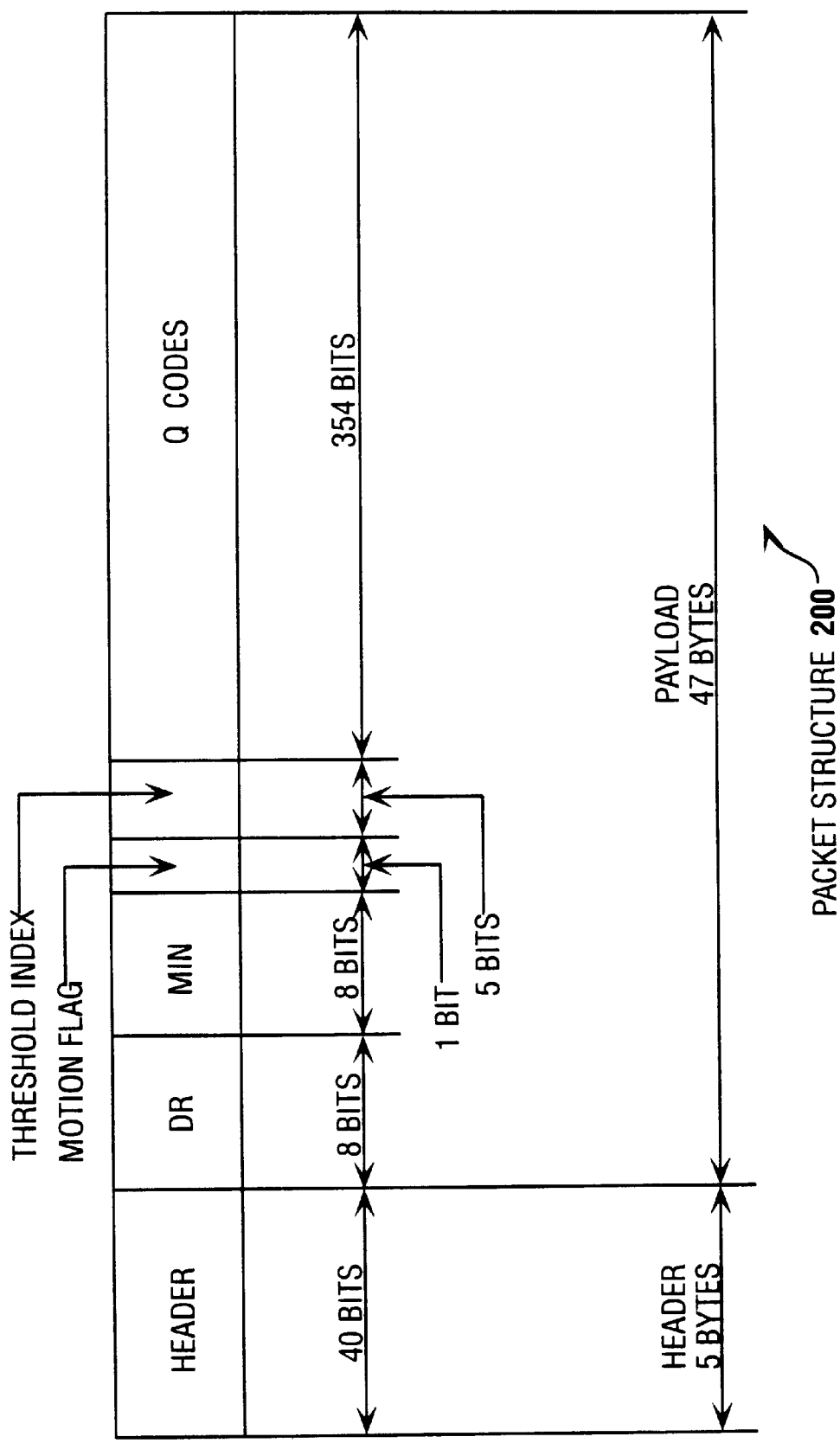
FIG. 2 illustrates one embodiment of a packet structure.

FIG. 2 illustrates one embodiment of Packet Structure 200 used for the transmission of the data across point-to-point connections as well as networks. Packet Structure 200 is generated by Encoder 110 and is transmitted across Transmission Media 135. For one embodiment, Packet Structure 200 comprises five bytes of header information, eight DR bits, eight MIN bits, a Motion Flag bit, a five bit threshold index, and 354 bits of Q codes. In an alternate embodiment, the MIN bits may be replaced with CEN bits. The packet structure described herein is illustrative and may typically be implemented for transmission in an asynchronous transfer mode ("ATM") network. However, the present invention is not limited to the packet structure described and a variety of packet structures that are used in a variety of networks can be utilized.

As noted earlier, Transmission Media (e.g., media) 135 is not assumed to provide error-free transmission and therefore packets may be lost or damaged. As noted earlier, conventional methods exist for detecting such loss or damage, but substantial image degradation will generally occur. The system and methods of the present invention therefore teach source coding to provide robust recovery from such loss or damage. It is assumed throughout the following discussion that a burst loss, that is the loss of several consecutive packets, is the most probable form of error, but some random packet losses might also occur.

To ensure a robust recovery for the loss of one or more consecutive packets of data, the system and methods of the present invention provide multiple level shuffling. In particular, the FL-data included in a transmitted packet comprise data from spatially and temporally disjointed locations of an image. Shuffling data ensures that any burst error is scattered and facilitates error recovery. As will be described below, the shuffling allows recovery of block attributes and Qbit values.

Data Encoding/Decoding

Figure 3:
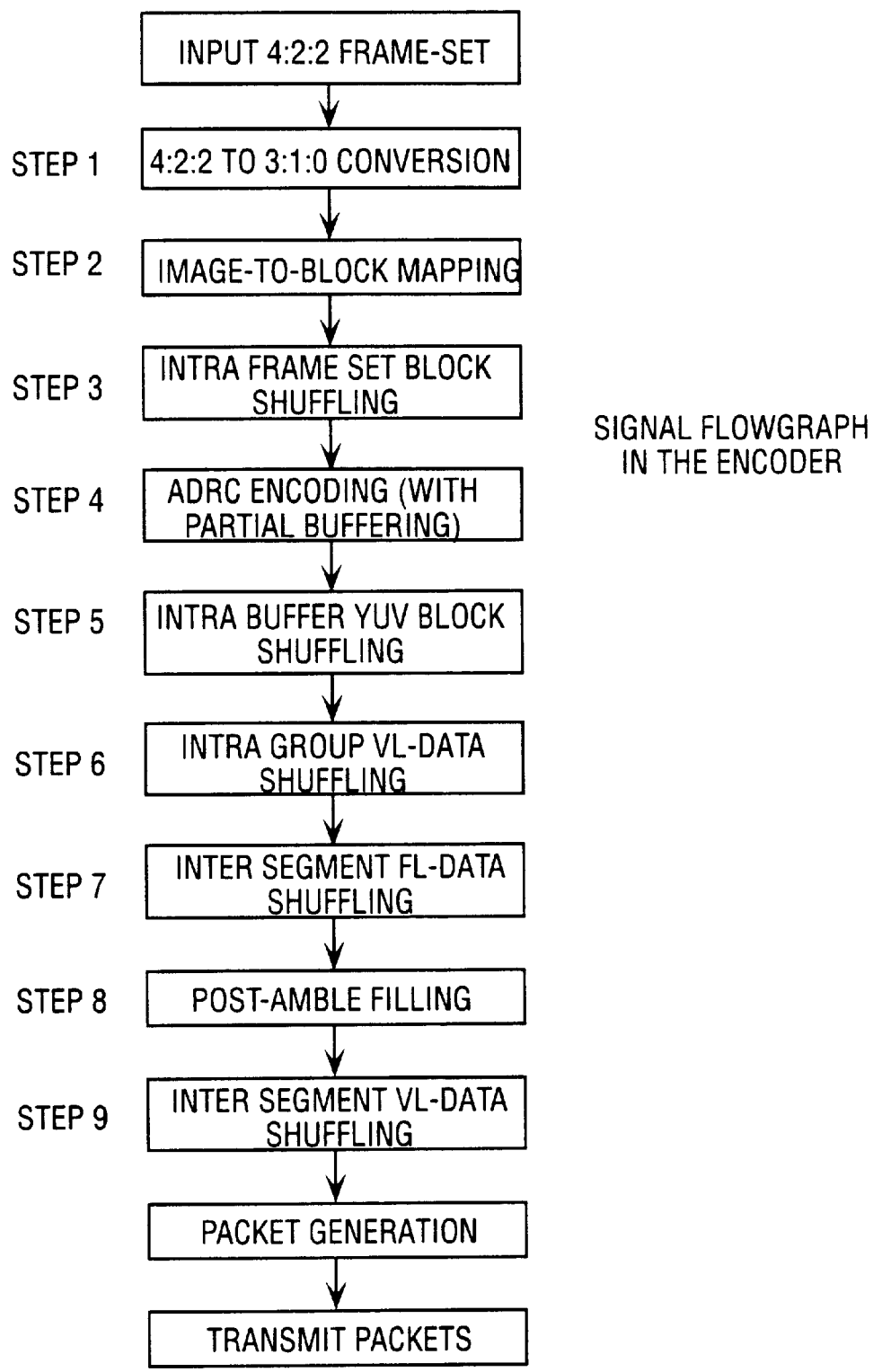
FIG. 3 is a flow diagram illustrating one embodiment of the encoding process.

FIG. 3 is a flow diagram illustrating one embodiment of the encoding process performed by Encoder 110. FIG. 3 further describes an overview of the shuffling process used to ensure against image degradation and to facilitate a robust error recovery.

In step one of FIG. 3, an input frame set, also referred to as a display component, may be decimated to reduce the transmission requirements. The Y signal is decimated horizontally to three-quarters of its original width and the U and V signals are each decimated to one-half of their original height and one-half of their original width. This results in a 3:1:0 video format with 3960 Y blocks, 660 U blocks and 660 V blocks in each frame pair. As noted earlier, the discussion will describe the processing of Y signals; however, the process is applicable to the U and V signals. At step two, the two Y frame images are mapped to 3 D blocks. At step three, 3 D blocks are shuffled. At step four, ADRC buffering and encoding is used. At step five, encoded Y, U and V blocks are shuffled within a buffer.

At step six, the VL-data for a group of encoded 3 D blocks and their corresponding block attributes are shuffled. At step seven, the FL-data is shuffled across different segments. At step eight, post-amble filling is performed in which variable space at the end of a buffer is filled with a predetermined bitstream. At step nine, the VL-data is shuffled across different segments.

For illustrative purposes the following shuffling description provides a method for manipulation of pixel data before and after encoding. For an alternative embodiment, independent data values are shuffled/deshuffled via hardware. In particular, the hardware maps the address of block values to different addresses to implement the shuffling/deshuffling process. However, address mapping may not be possible for data dependent values because shuffling may follow the processing of data. The intra group VL-data shuffling described below includes the data dependent values. Further, for illustrative purposes the following shuffling description occurs on discrete sets of data. However, for alternative embodiments a signal may be defined based on multiple data levels ranging from bits, to pixels, and to frames. Shuffling may be possible for each level defined in the signal and across different data levels of the signal.

Figure 4:
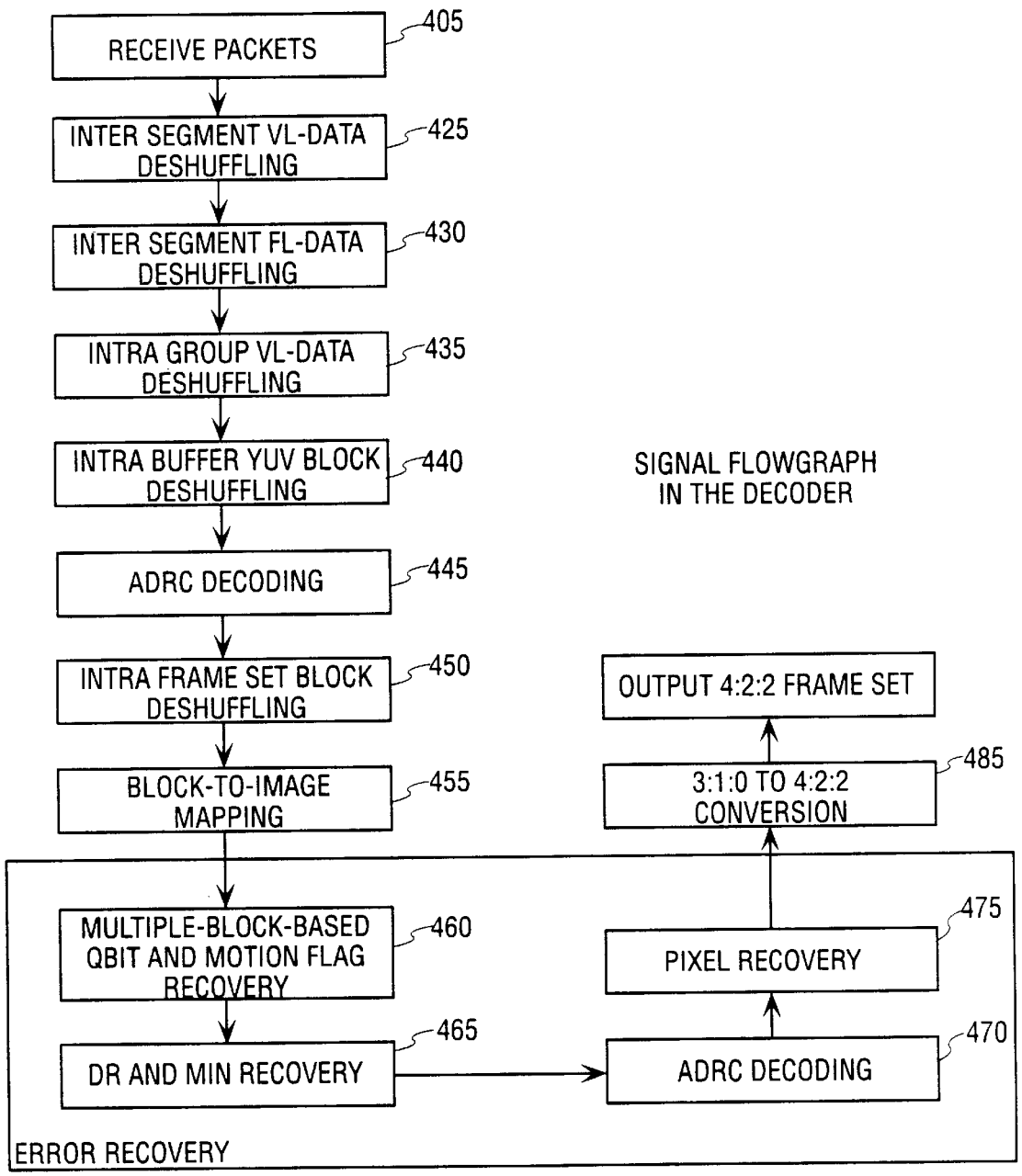
FIG. 4 is a flow diagram illustrating one embodiment of the decoding process.

FIG. 4 is a flow diagram illustrating one embodiment of decoding process performed by Decoder 120. The conversion and de-shuffling processes may be the inverse of the processes represented in FIG. 3. However, in one embodiment, time-varying de-randomization of Q codes and delayed decision decoding may be performed within step 435.

Image-to-Block Mapping

In the present embodiment, a single frame typically may comprise 5280 2 D blocks wherein each 2 D block comprises 64 pixels. Thus, a frame pair may comprise 5280 3 D blocks as a 2 D block from a first frame and a 2 D block from a subsequent frame are collected to form a 3 D block.

Image-to-block mapping is performed for the purpose of dividing a frame or frame set of data into 2 D blocks or 3 D blocks respectively. Moreover, image-to-block mapping includes using a complementary and/or interlocking pattern to divide pixels in a frame to facilitate robust error recovery during transmission losses. However, to improve the probability that a given DR value is not too large, each 2 D block is constructed from pixels in a localized area.

Figure 5:
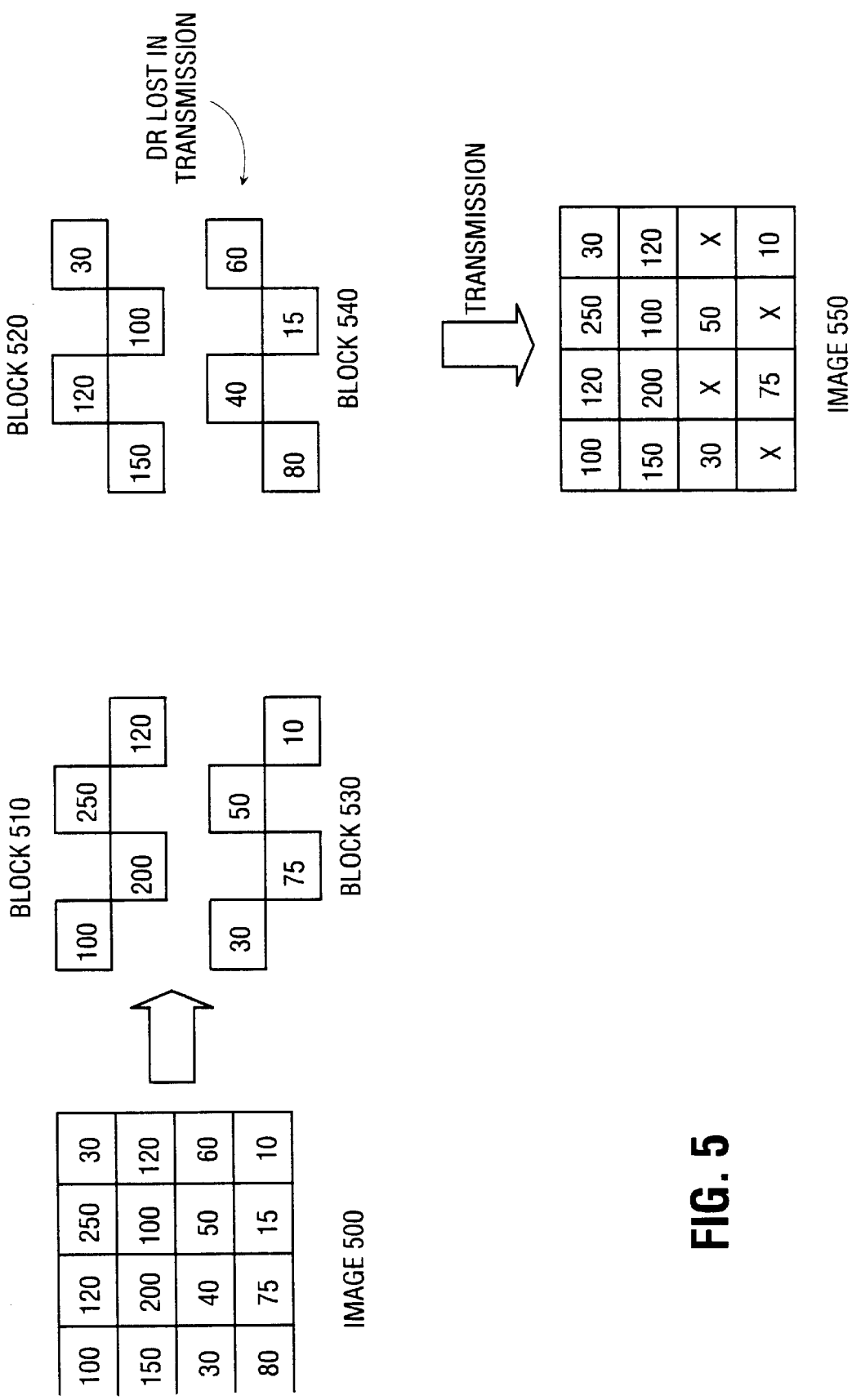
FIG. 5 illustrates one embodiment of image-to-block mapping.

FIG. 5 illustrates one embodiment of an image-to-block mapping process for an exemplary 16-pixel section of an image. Image 500 comprises 16 pixels forming a localized area of a single frame. Each pixel in Image 500 is represented by an intensity value. For example, the pixel in the top left-hand side of the image has an intensity value equal to 100 whereas the pixel in the bottom right hand side of the image has an intensity value of 10.

In one embodiment, pixels from different areas of Image 500 are used to create 2 D Blocks 510, 520, 530, and 540. 2 D Blocks 510, 520, 530, and 540 are encoded, shuffled (as illustrated below), and transmitted. Subsequent to transmission, 2 D Blocks 510, 520, 530, and 540 are recombined and used to form Image 550. Image 550 is a reconstruction of Image 500.

To ensure accurate representation of Image 500 despite a possible transmission loss, is an interlocking complementary block structure, one embodiment of which is illustrated in FIG. 5, is used to reconstruct Image 550. In particular, the pixel selection used to create 2 D Blocks 510, 520, 530, and 540 ensures that a complementary and/or interlocking pattern is used to recombine the blocks when Image 550 is reconstructed. Accordingly, when a particular 2 D block's attribute is lost during transmission, contiguous sections of Image 550 are not distorted during reconstruction.

For example, as illustrated in FIG. 5, the DR of 2 D Block 540 is lost during data transmission. However, during reconstruction of Image 550, the decoder utilizes multiple neighboring pixels of neighboring blocks through which a DR can be recovered for the missing DR of 2 D Block 540. In addition, as will be subsequently described, the combination of complementary patterns and shifting increases the number of neighboring pixels, preferably maximizing the number of neighboring pixels that originate from other blocks, significantly improving DR and MIN recovery.

Figure 5A:
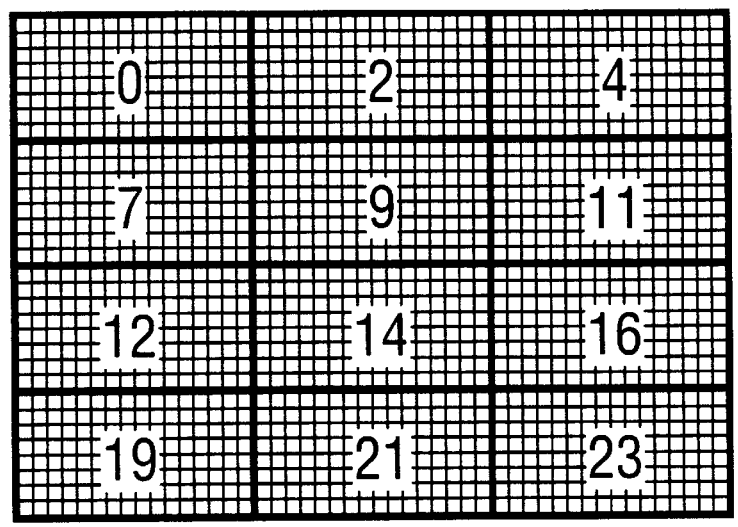
FIG. 5a illustrates one embodiment of a shuffling pattern used in image-to-block mapping.
Figure 5A:
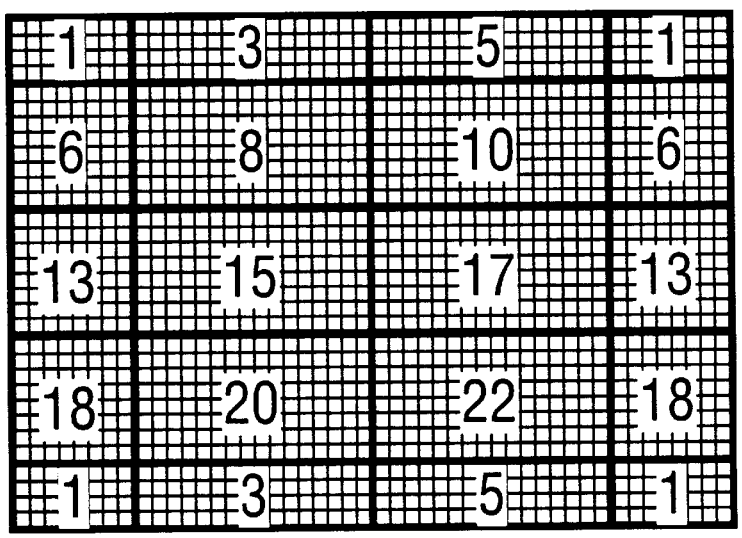

FIG. 5a illustrates one embodiment of a shuffling pattern used to form 2 D blocks in one embodiment of the image-to-block mapping process. An image is decomposed into two sub-images, Sub-Image 560 and Sub-Image 570, based on alternating pixels. Rectangular shapes are formed in Sub-Image 560 to delineate the 2 D block boundaries. For purposes of discussion, the 2 D blocks are numbered 0, 2, 4, 7, 9, 11, 12, 14, 16, 19, 21, and 23. Tile 565 illustrates the pixel distribution for a 2 D block within Sub-Image 560.

In Sub-Image 570, the 2 D block assignment is shifted by eight pixels horizontally and four pixels vertically. This results in a wrap around 2 D block assignment and overlap when Sub-Images 560 and 570 are combined during reconstruction. The 2 D blocks are numbered 1, 3, 5, 6, 8, 10, 13, 15, 17, 18, 20, and 22. Tile 575 illustrates the pixel distribution for a 2 D block within Sub-Image 570. Tile 575 is the complementary structure of Tile 565. Accordingly, when a particular block's attribute is lost during transmission, neighboring pixels through which a block attribute can be recovered for the missing 2 D block exists. Additionally, an overlapping 2 D block of pixels with a similar set of block attributes exist. Therefore, during reconstruction of the image the decoder has multiple neighboring pixels from adjacent 2 D blocks through which a lost block attribute can be recovered.

Figure 6:
FIG. 6 is an illustration of exemplary complementary and interlocking block structures.
Figure 6:
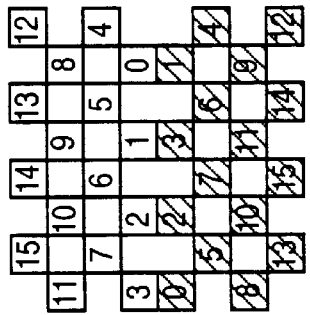
Figure 6:
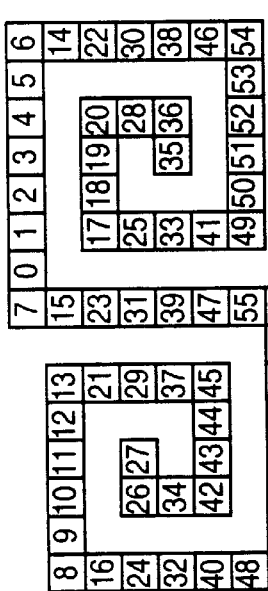
Figure 6:
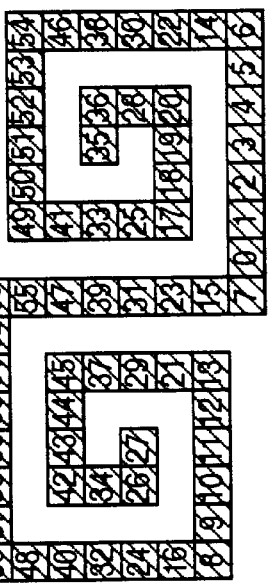
Figure 6:
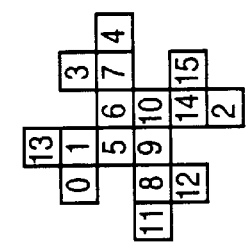

FIG. 6 illustrates other complementary and interlocking 2 D block structures. Other structures may also be utilized. Similar to FIG. 5, these 2 D block structures illustrated in FIG. 6, ensure surrounding 2 D blocks are present despite transmission losses for a given 2 D block. However, Patterns 610a, 610b, and 610d use horizontal and/or vertical shifting during the mapping of pixels to subsequent 2 D blocks. Horizontal shifting describes shifting the tile structure in the horizontal direction a predetermined number of pixels prior to beginning a new 2 D block boundary. Vertical shifting describes shifting the tile structure in the vertical direction a predetermined number of pixels prior to beginning a new 2 D block boundary. In application, horizontal shifting may be applied, vertical shifting may only be applied, or a combination of horizontal and vertical shifting may be applied.

Pattern 610a illustrates a spiral pattern used for image-to-block mapping. The spiral pattern follows a horizontal shifting to create subsequent 2 D blocks during the image-to-block mapping process. Patterns 610b and 610d illustrate complementary patterns wherein pixel selection is moved by a horizontal and vertical shifting to create subsequent 2 D blocks during the image-to-block mapping process. In addition, Patterns 610b and 610d illustrate alternating offsets on pixels selection between 2 D blocks. Pattern 610c illustrates using an irregular sampling of pixels to create a 2 D block for image-to-block mapping. Accordingly, the image-to-block mapping follows any mapping structure provided a pixel is mapped to a 2 D block only once.

FIG. 5, FIG. 5a and FIG. 6 describe image-to-block mapping for 2 D block generation. It is readily apparent that the processes are applicable to 3 D blocks. As described above, 3 D block generation follows the same boundary definition as a 2 D block, however the boundary division extends across a subsequent frame resulting in a 3 D block. In particular, a 3 D block is created by collecting the pixels used to define a 2 D block in a first frame together with pixels from a 2 D block in a subsequent frame. In one embodiment, both pixels in the 2 D block from the first frame and the 2 D block from the subsequent frame are from the exact same location.

Intra Frame Set Block Shuffling

The pixel values for a given image are closely related for a localized area. However, in another area of the same images the pixel values may have significantly different values. Thus, subsequent to encoding, the DR and MIN values for spatially close 2 D or 3 D blocks in a section of an image have similar values, whereas the DR and MIN values for blocks in another section of the image may be significantly different. Accordingly, when buffers are sequentially filled with encoded data from spatially close 2 D or 3 D blocks of an image, a disproportionate usage of buffer space occurs. Intra frame set block shuffling occurs prior to ADRC encoding and includes shuffling the 2 D or 3 D blocks generated during the image-to-block mapping process. This shuffling process ensures an equalized buffer usage during a subsequent ADRC encoding.

FIGS. 7a–7d illustrate one embodiment of shuffling 3 D Y-blocks. The 3 D Y-blocks in FIGS. 7a–7d are generated from applying the image-to-block mapping process described above to a frame pair containing only Y signals. The 3 D Y-blocks are shuffled to ensure that the buffers used to store the encoded frame pair contain 3 D Y-blocks from different parts of the frame pair. This leads to similar DR distribution during ADRC encoding. A similar DR distribution within each buffer leads to consistent buffer utilization.

FIGS. 7a–7d also illustrate 3 D block shuffling using physically disjointed 3 D blocks to ensure that transmission loss of consecutive packets results in damaged block attributes scattered across the image, as opposed to a localized area of the image.

The block shuffling is designed to widely distribute block attributes in the event of small, medium, or large, burst packet losses occur. In the present embodiment, a small burst loss is one in which a few packets are lost; a medium loss is one in which the amount of data that can be held in one buffer is lost; and a large loss is one in which the amount of data that can be held in one segment is lost. During the 3 D block shuffling each group of three adjacent blocks are selected from relatively remote parts of the image. Accordingly, during the subsequent intra group VL-data shuffling (to be detailed later), each group is formed from 3 D blocks that have differing statistical characteristics. Distributed block attribute losses allow for a robust error recovery because a damaged 3 D block is surrounded by undamaged 3 D blocks and the undamaged 3 D blocks can be used to recover lost data.

Figure 7A:
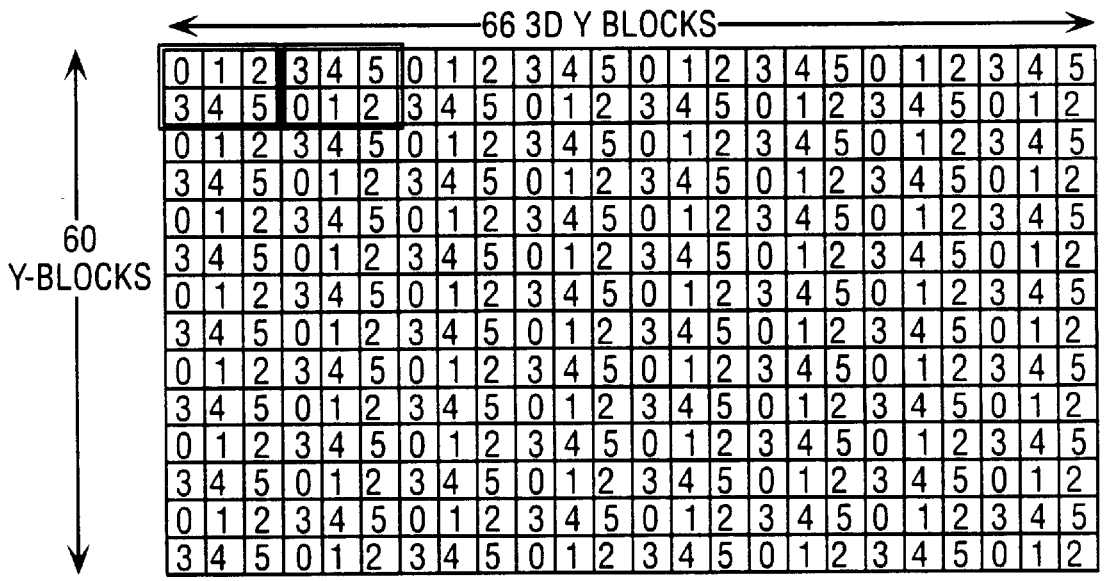
FIGS. 7a, 7b, 7c, 7d illustrate one embodiment of shuffling patterns for Y blocks within a frame set.

FIG. 7a illustrates a frame pair containing 66 3 D Y-blocks in the horizontal direction and 60 3 D Y-blocks in the vertical direction. The 3 D Y-blocks are allocated into Segments 0–5. As illustrated, the 3 D Y-block assignment follows a two by three column section such that one 3 D Y-block from each section is associated with a segment. Thus, if no further shuffling is performed and a burst loss of the first 880 packets occurs, all the block attributes associated with Segment 0 are lost, However, as later described, FL-data shuffling is performed to further disperse block attribute losses.

Figure 7B:
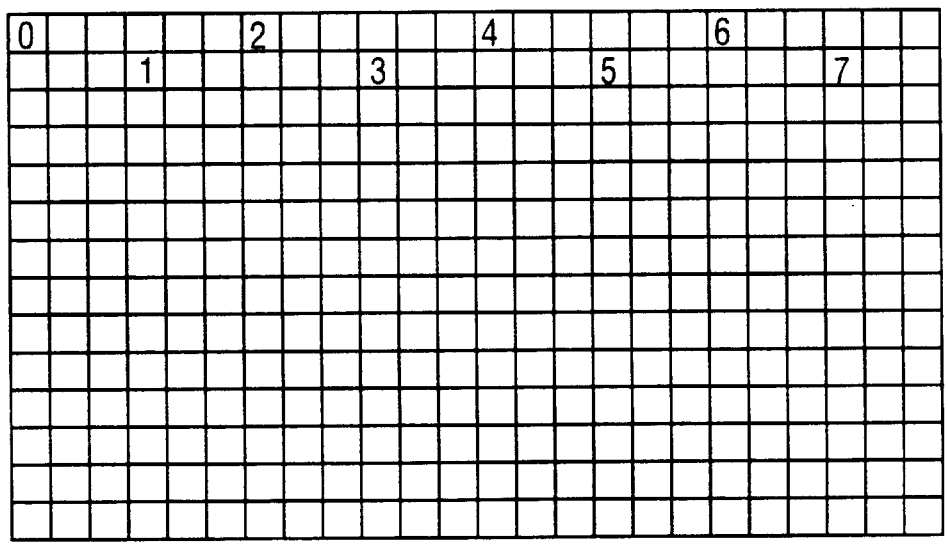

FIG. 7b illustrates the scanning order of 3 D Y-blocks numbered "0" used to enter into Segment 0. Each "0" 3D Y-block of FIG. 7a is numbered 0, 1, 2, 3, . . . 659 to illustrate their location in the stream that is inputted into Segment 0. Using the block numbering to allocate segment assignment the remaining 3 D Y-blocks are inputted into Segments 1–5, thus resulting in a frame pair shuffled across multiple segments.

Figure 7C:
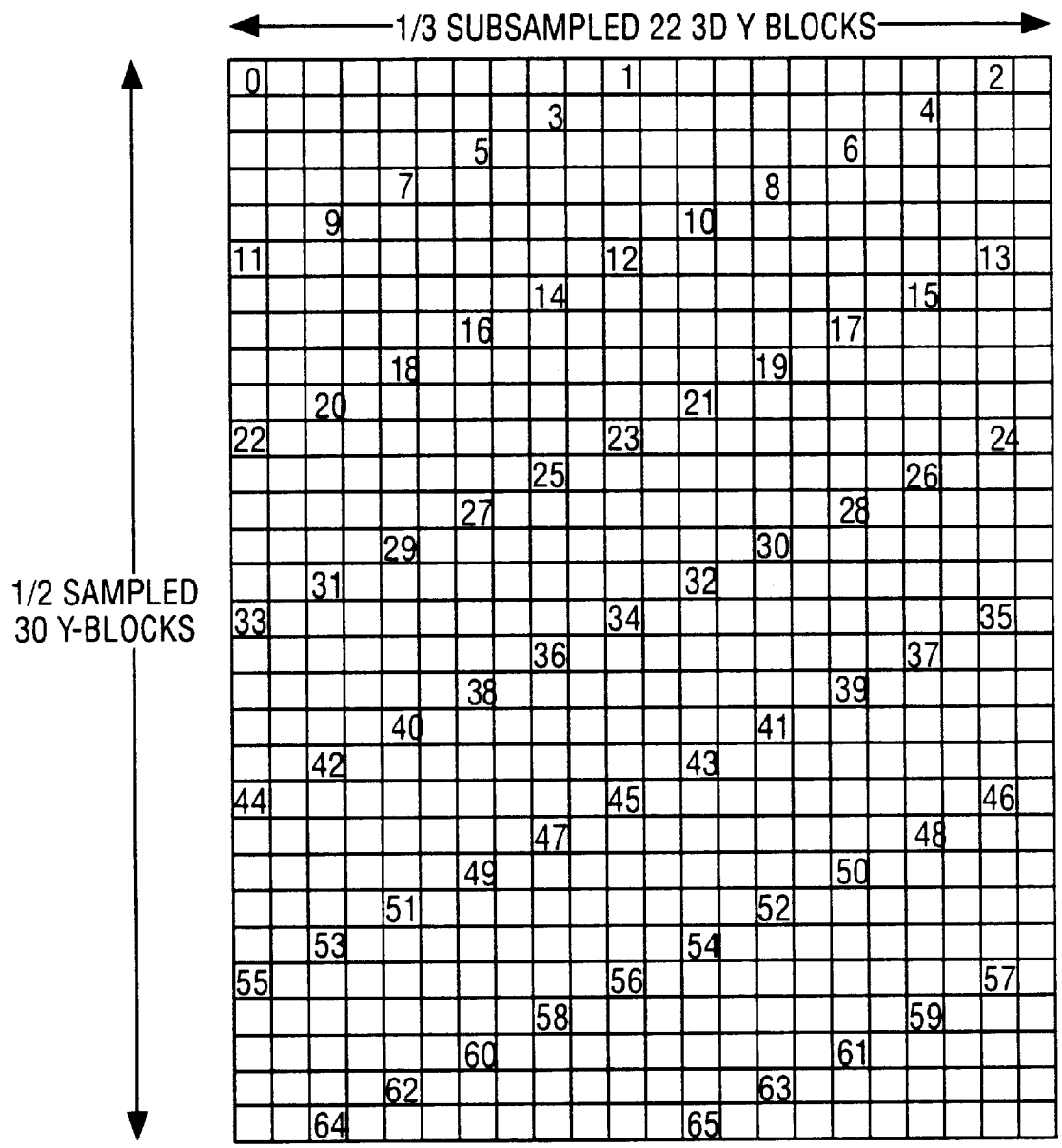

FIG. 7c illustrates the 660 3 D Y-blocks comprising one segment. The 3 D Y-blocks numbered 0–65 are inputted into Buffer 0. Similarly the 3 D Y-blocks adjacent to the numbered 3 D Y-blocks are inputted into Buffer 1. The process is repeated to fill Buffers 2–9. Accordingly, damage to a buffer during data transmission results in missing 3 D Y-blocks from different parts of the image.

Figure 7D:
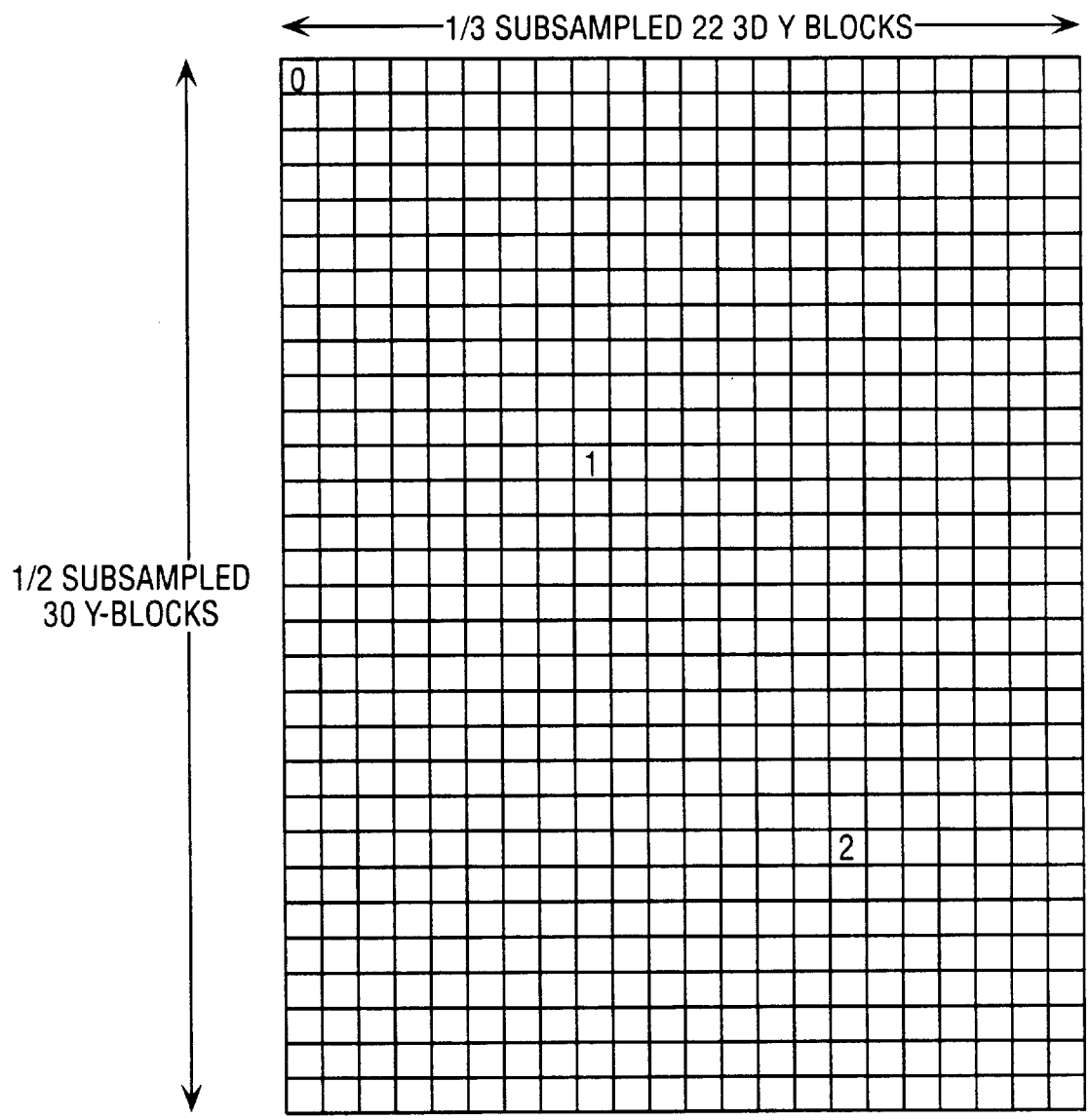

FIG. 7d illustrates the final ordering of the "0" 3 D Y-blocks across a buffer. 3 D Y-blocks 0, 1, and 2 occupy the first three positions in the buffer. The process is repeated for the rest of the buffer. Accordingly, loss of three 3 D Y-blocks during data transmission results in missing 3 D Y-blocks from distant locations within the image.

FIGS. 7a–d illustrate one embodiment of 3 D block distributions for 3 D Y-blocks of a frame set. In alternative embodiments, however, 3 D block distributions for 3 D U-blocks and 3 D V-blocks are available. The 3 D U-blocks are generated from applying the image-to-block mapping process, described above, to a frame set containing only U signals. Similarly, 3 D V-blocks are generated from applying the image-to-block mapping process to a frame set containing only V signals. Both the 3 D U-block and the 3 D V-block follow the 3 D Y-block distribution described above. However, as previously described, the number of 3 D U-blocks and 3 D V-blocks each have a 1:6 proportion to 3 D Y-blocks.

FIGS. 7a–d are used to illustrate one embodiment of intra frame set block shuffling for a Y signal such that burst error of up to ⅙ of the packets lost during transmission is tolerated and further ensures equalized buffer use. It will be appreciated by one skilled in the art that segment, buffer, and ADRC block assignments can be varied to ensure against 1/n burst error loss or to modify buffer utilization.

Partial Buffering

As illustrated in FIG. 3, the ADRC encoding and buffering processes occur in step four. Dependent on the encoding technique, 2 D or 3 D blocks generated during the image-to-block mapping process are encoded resulting in 2 D or 3 D ADRC blocks. In one embodiment, a 3 D ADRC block contains Q codes, a MIN value, a Motion Flag, and a DR. Similarly, in one embodiment, a 2 D ADRC block contains Q codes, a MN, and a DR. A 2 D ADRC block, however, does not include a Motion Flag because the encoding is performed on a single frame or a single field.

A number of buffering techniques are found in the prior art (see for example, High Efficiency Coding Apparatus, U.S. Pat. No. 4,845,560 of Kondo et. al. and High Efficiency Coding Apparatus, U.S. Pat. No. 4,722,003 of Kondo). Both High Efficiency Coding Apparatus patents are hereby incorporated by reference.

The partial buffering process set forth below describes an innovative method for determining the encoding bits used in ADRC encoding. In particular, partial buffering describes a method of selecting threshold values from a threshold table designed to provide a constant transmission rate between remote terminals while restricting error propagation. In an alternative embodiment, the threshold table is further designed to provide maximum buffer utilization. In one embodiment, a buffer is a memory that stores a one-sixtieth division of encoded data from a given frame set. The threshold values are used to determine the number of Qbits used to encode the pixels in 2 D or 3 D blocks generated from the image-to-block mapping process previously described.

The threshold table includes rows of threshold values, also referred to as a threshold set, and each row in the threshold table is indexed by a threshold index. In one embodiment, the threshold table is organized with threshold sets that generate a higher number of Q code bits located in the upper rows of the threshold table. Accordingly, for a given buffer having a predetermined number of bits available, Encoder 110 moves down the threshold table until a threshold set that generates less than a predetermined number of bits is encountered. The appropriate threshold values are used to encode the pixel data in the buffer.

Figure 8:
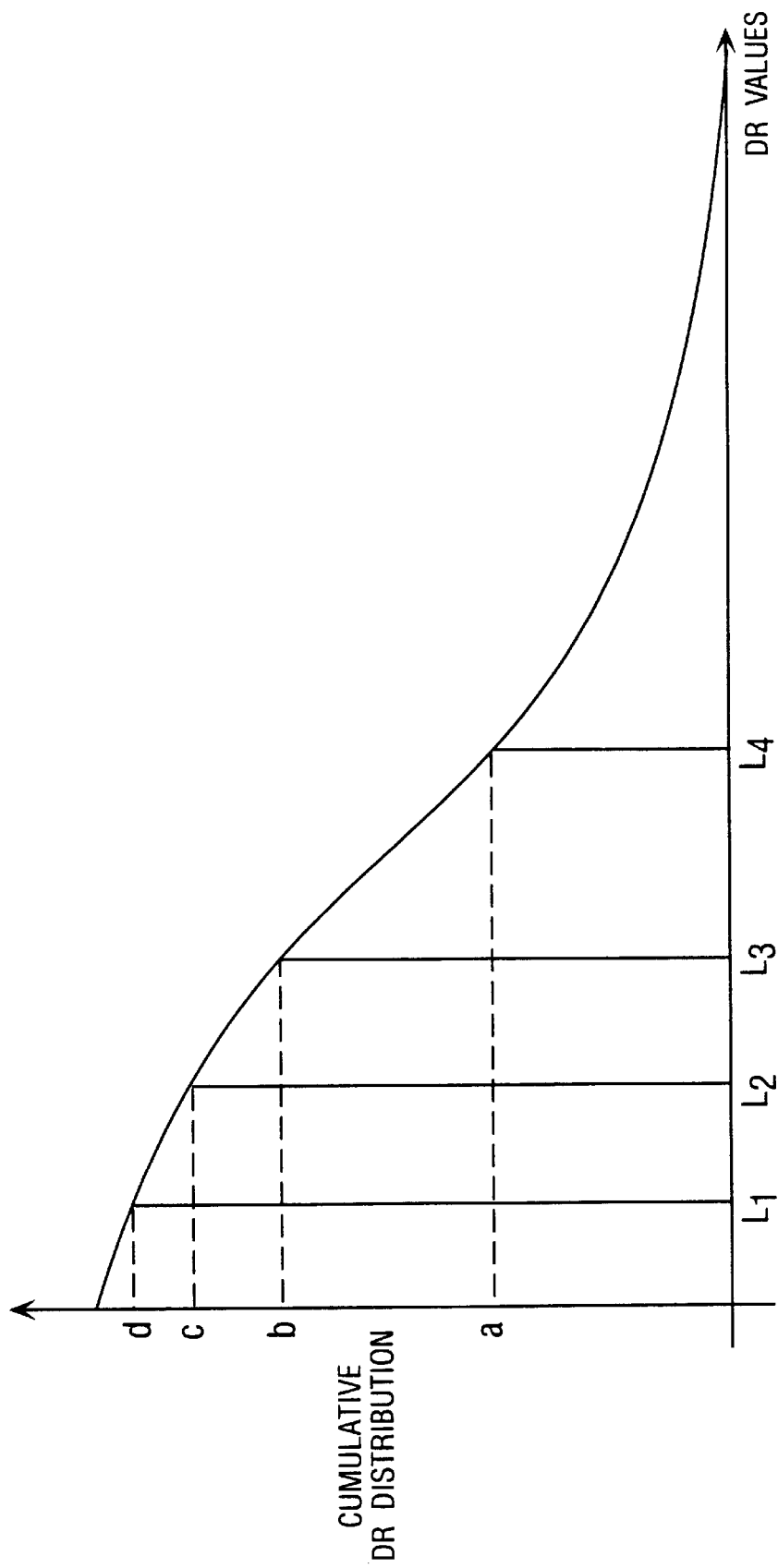
FIG. 8 is an illustration of one embodiment of cumulative DR distribution for Buffer 0.

FIG. 8 illustrates one embodiment of selected threshold values and the DR distribution for Buffer 0. The vertical axis of FIG. 8 includes the cumulative DR distribution. For example, the value "b" is equal to the number of 3 D or 2 D blocks whose DR is greater than or equal to $L_3$. The horizontal axis includes the possible DR values. In one embodiment, DR values range from 0 to 255. Threshold values $L_4$, $L_3$, $L_2$, and $L_1$ describe a threshold set used to determine the encoding of a buffer.

In one embodiment, all blocks stored in Buffer 0 are encoded using threshold values $L_4$, $L_3$, $L_2$, and $L_1$. Accordingly, blocks with DR values greater than $L_4$ have their pixel values encoded using four bits. Similarly, all pixels belonging to blocks with DR values between $L_3$ and $L_4$ are encoded using three bits. All pixels belonging to blocks with DR values between $L_2$ and $L_3$ are encoded using two bits. All pixels belonging to blocks with DR values between $L_1$ and $L_2$ are encoded using one bit. Finally, all pixels belonging to blocks with DR values smaller than $L_1$ are encoded using zero bits. $L_4$, $L_3$, $L_2$, and $L_1$ are selected such that the total number of bits used to encode all the blocks in Buffer 0 is as close as possible to a limit of 31,152 bits without exceeding the limit of 31,152.

Figure 8A:
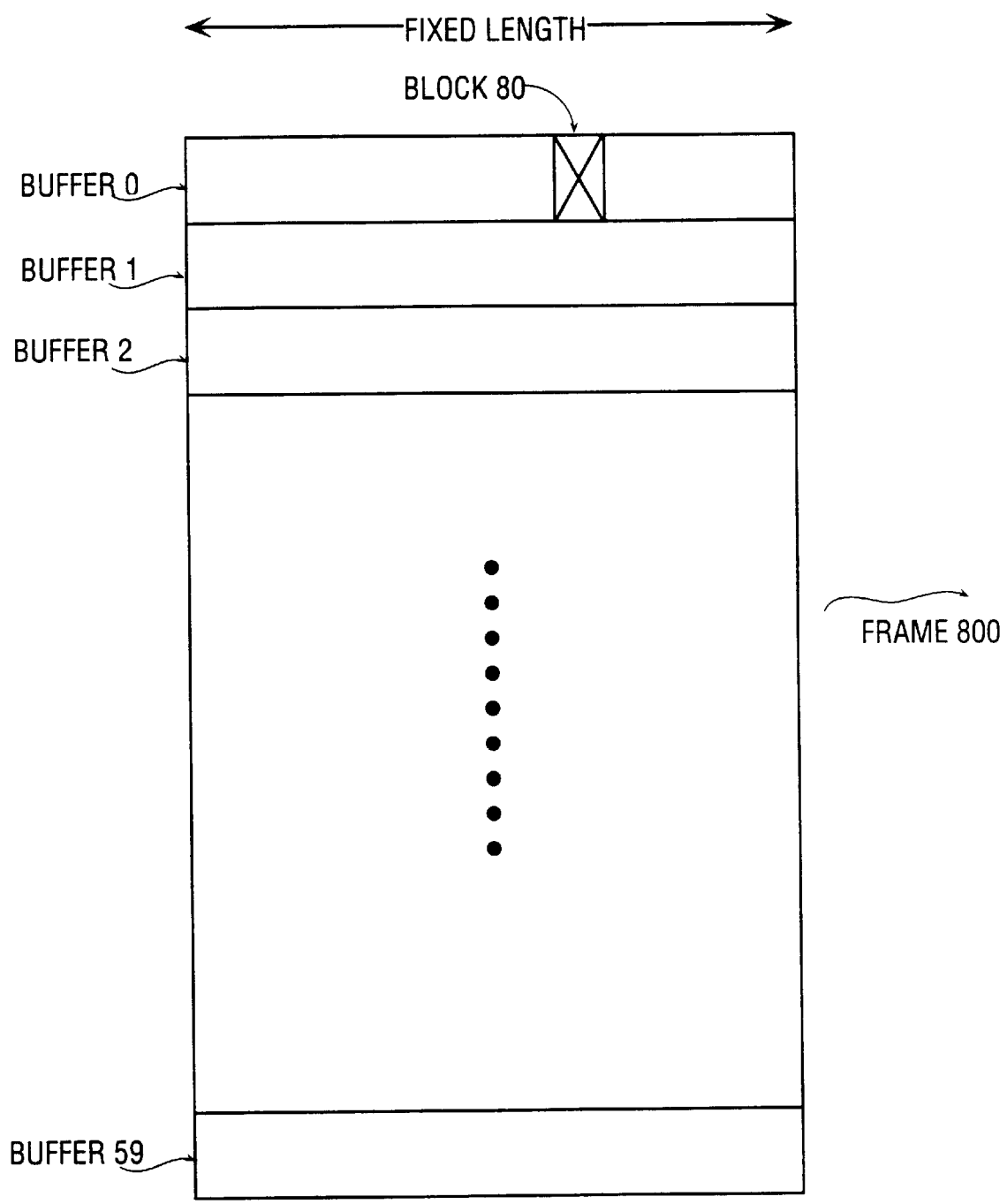
FIG. 8a is an illustration of one embodiment of a partial buffering process.

FIG. 8a illustrates the use of partial buffering in one embodiment. Frame 800 is encoded and stored in Buffers 0–59. Provided a transmission error inhibits data recovery, the decoding process is stalled for Frame 800 until error recovery is performed on the lost data. However, partial buffering restricts the error propagation within a buffer, thus allowing decoding of the remaining buffers. In one embodiment, a transmission error inhibits the Qbit and Motion Flag recovery for Block 80 in Buffer 0. Partial buffering limits the error propagation to the remaining blocks within Buffer 0. Error propagation is limited to Buffer 0 because the end of Buffer 0 and the beginning of Buffer 1 are known due to the fixed buffer length. Accordingly, Decoder 120 can begin processing of blocks within Buffer 1 without delay. Additionally, the use of different threshold sets to encode different buffers allows Encoder 110 to maximize/control the number of Q codes bits included in a given buffer, thus allowing a higher compression ratio. Furthermore, the partial buffering process allows for a constant transmission rate because Buffers 0–59 consist of a fixed length.

In one embodiment, a buffer's variable space is not completely filled with Q code bits because a limited number of threshold sets exist. Accordingly, the remaining bits in the fixed length buffer are filled with a predetermined bitstream pattern referred to as a post-amble. As will be described subsequently, the post-amble enables bidirectional data recovery because the post-amble delineates the end of the VL-data prior to the end of the buffer.

Intra Buffer YUV Block Shuffling

Y, U, and V, signals each have unique statistical properties. To improve the Qbit and Motion Flag recovery process (described below) the Y, U, and V signals are multiplexed within a buffer. Accordingly, transmission loss does not have a substantial effect on a specific signal.

Figure 9:
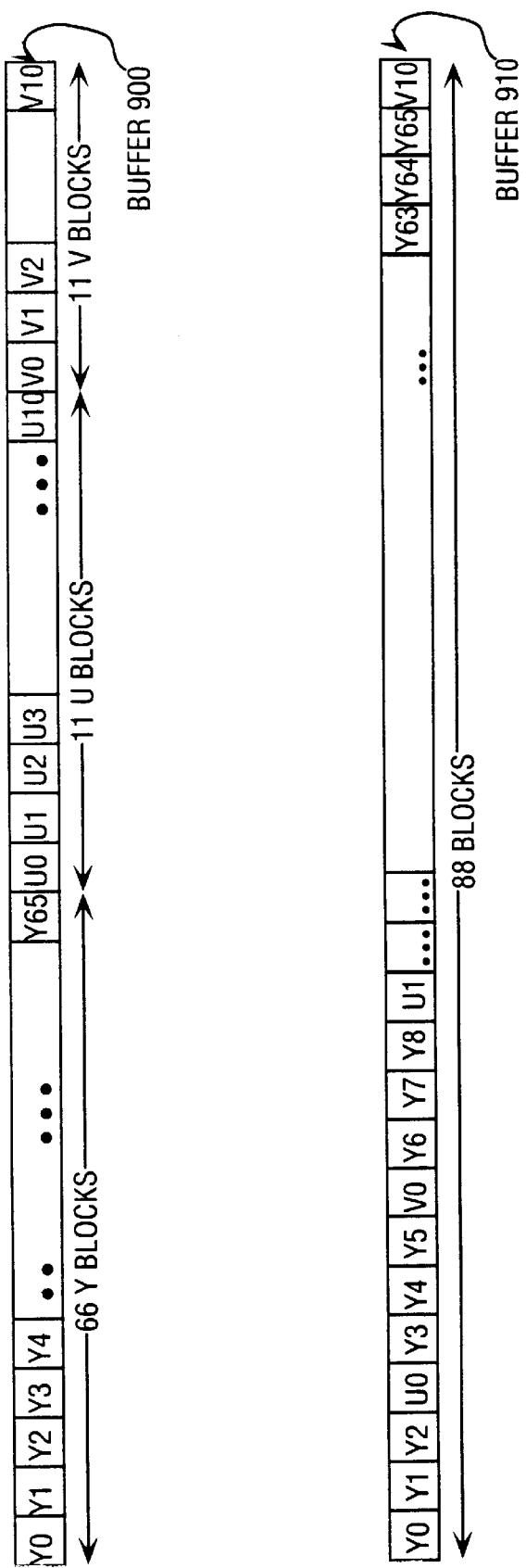
FIG. 9 illustrates one embodiment of the intra buffer YUV block shuffling process.

FIG. 9 illustrates one embodiment of the intra buffer YUV block shuffling process in which YUV ADRC blocks are derived from the Y, U, and V signals respectively. Buffer 900 illustrates the ADRC block assignments after intra frame set block shuffling. Buffer 900 comprises 66 Y-ADRC blocks followed by 11 U-ADRC blocks which are in turn followed by 11 V-ADRC blocks. Buffer 910 shows the YUV ADRC block organization after intra buffer YUV block shuffling. As illustrated, three Y-ADRC blocks are followed by a U-ADRC block or three Y-ADRC blocks are followed by a V-ADRC block. Intra buffer YUV block shuffling reduces similarity between adjacent block's bitstreams within the buffer. Alternative embodiments of intra buffer YUV block shuffling with a different signal, i.e., YUV ratios or other color spaces are possible dependent on the initial image format.

Intra Group VL-Data Shuffling

Figure 10:
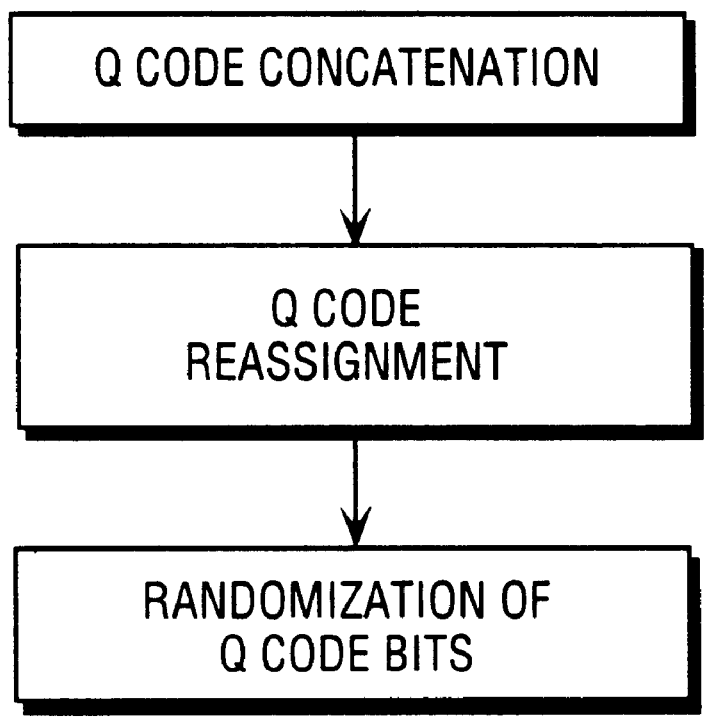
FIG. 10 illustrates one embodiment of the intra group VL-data shuffling process.

In one embodiment, Intra group VL-data shuffling comprises three processing steps. The three processing steps include Q code concatenation, Q code reassignment, and time-varying randomizing of Q codes. FIG. 10 illustrates one embodiment of intra group VL-data shuffling wherein three processing steps are applied consecutively to Q codes stored in a buffer. In alternative embodiments, the time-varying randomization processing step only may be applied to perform intra group VL-data shuffling. Each processing step independently assists in the error recovery of data lost during transmission. Accordingly, each processing step is described independently.

1. Q code concatenation

Figure 11:
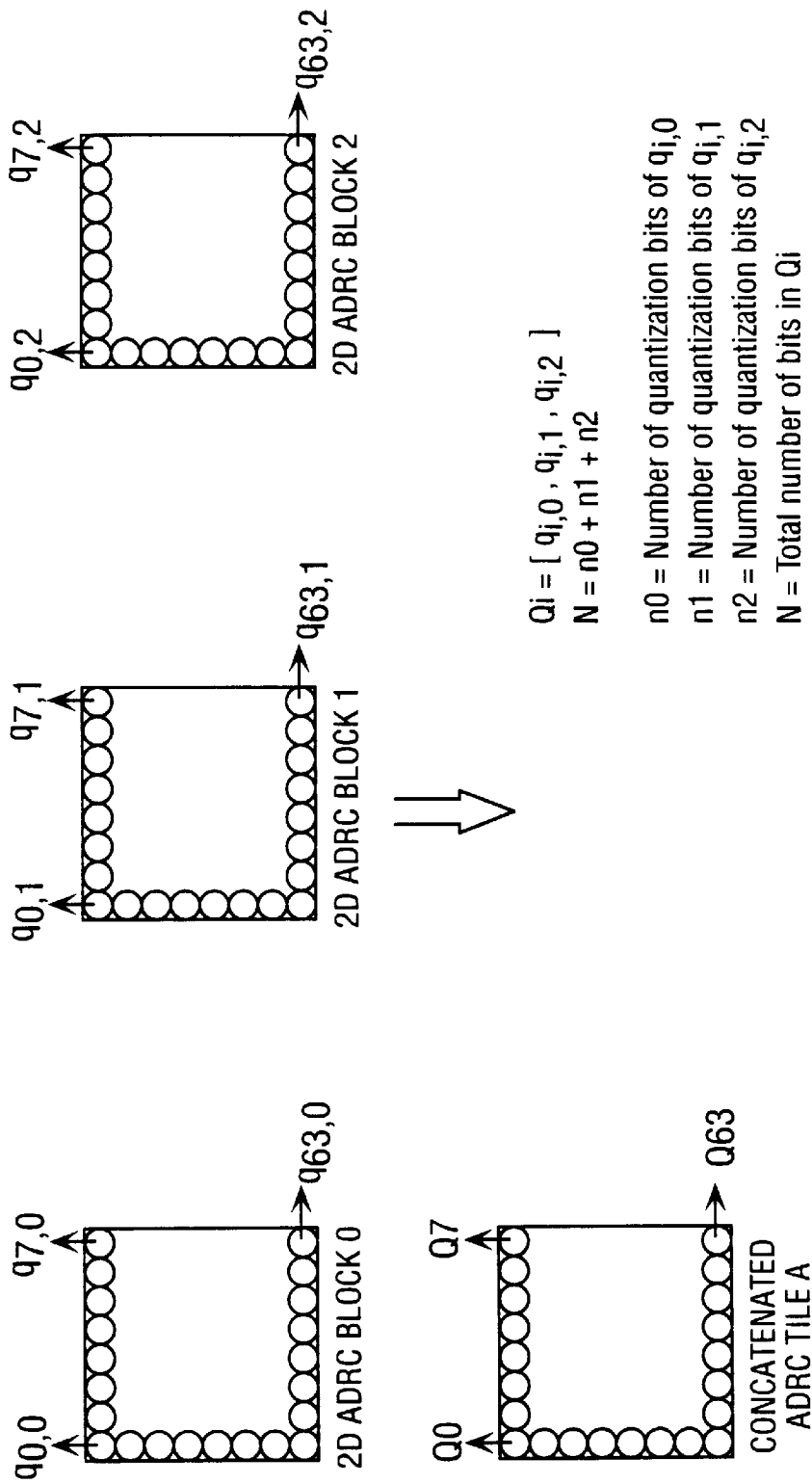
FIG. 11 illustrates one embodiment of Q code concatenation within a 3-block group.
Figure 11A:
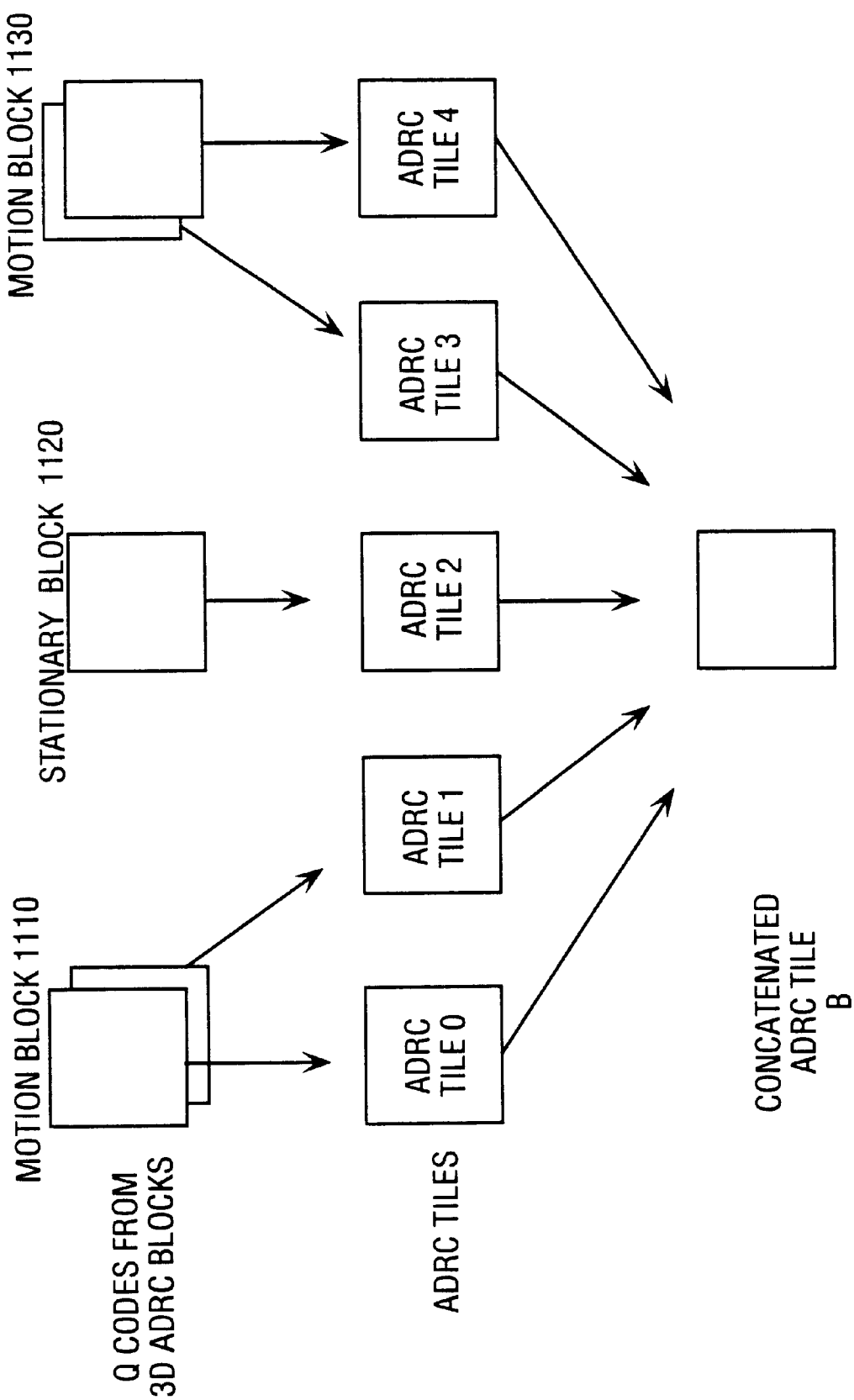
FIG. 11a illustrates one embodiment of Q code concatenation for frame pairs including motion blocks.

Q code concatenation ensures that groups of ADRC blocks are decoded together. Group decoding facilitates error recovery because additional information is available from neighboring blocks during the data recovery process detailed below. For one embodiment, Q code concatenation may be applied independently to each group of three ADRC blocks stored in a buffer. In an alternative embodiment, a group includes ADRC block(s) from different buffers. The concatenation of Q codes across three ADRC blocks is described as generating one concatenated ADRC tile. FIG. 11 and FIG. 11a illustrate one embodiment of generating concatenated ADRC tiles.

FIG. 11 illustrates one embodiment of generating a concatenated ADRC tile from 2 D ADRC blocks. Specifically, the concatenation is performed for each Q code (q0–q63) included in 2 D ADRC Blocks 0, 1, and 2 resulting in the sixty four Q codes of Concatenated ADRC Tile A. For example, the first Q code $q_{0,0}$ (0th quantized value) of 2 D ADRC Block 0 is concatenated to the first Q code $q_{0,1}$ of 2 D ADRC Block 1. The two concatenated Q codes are in turn concatenated to the first Q code $q_{0,2}$ of 2D ADRC Block 2, thus resulting in $Q_0$ of Concatenated ADRC Tile A. The process is repeated until $Q_{63}$ is generated. Alternatively, the generation of Qi in Concatenated ADRC Tile A is described by the equation $$Q_i = [q_{i,0}, q_{i,1}, q_{1,2}] \ i=0, 1, 2, \ldots 63$$

Additionally, associated with each Qi in Concatenated ADRC Tile A there is a corresponding number of N bits that represents the total number of bits concatenated to generate a single $Q_i$.

FIG. 11a illustrates one embodiment of generating a concatenated ADRC tile from frame pairs including motion blocks. A motion block is a 3 D ADRC block with a set Motion Flag. The Motion Flag may be set when a predetermined number of pixels within two 2 D blocks structure created by image-to-block mapping process described earlier, change in value between a first frame and a subsequent frame. In an alternative embodiment, the Motion Flag may be set when the maximum value of each pixel change between the 2 D block of a first frame and a subsequent frame exceeds a predetermined value. In contrast, non-motion (i.e., stationary) block includes a 3 D ADRC block with a Motion Flag that is not set. The Motion Flag remains un-set when a predetermined number of pixels within the two 2 D blocks of a first frame and a subsequent frame do not change in value. In an alternative embodiment, the Motion Flag remains un-set when the maximum value of each pixel change between a first frame and a subsequent frame does not exceed a predetermined value.

A motion block includes Q codes from an encoded 2 D block in a first frame and an encoded 2 D block in a subsequent frame. The collection of Q codes corresponding to a single encoded 2 D block are referred to as an ADRC tile. Accordingly, a motion block generates two ADRC tiles. However, due to the lack of motion, a stationary block need only include one-half of the number of Q codes of a motion block, thus generating only one ADRC tile. In the present embodiment, the Q codes of a stationary block are generated by averaging corresponding pixels values between a 2 D block in a first frame and a corresponding 2 D block in a subsequent frame. Each averaged pixel value is subsequently encoded resulting in the collection of Q codes forming a single ADRC tile. Accordingly, Motion Blocks 1110 and 1130 generate ADRC Tiles 0, 1, 3, and 4. Stationary Block 1120 generates ADRC Tile 2.

The concatenated ADRC tile generation of FIG. 11a concatenates the Q codes for ADRC Tiles 0–4 into Concatenated ADRC Tile B. Specifically, the concatenation may be performed for each Q code (qo - q63) included in ADRC Tiles 0, 1, 2, 3 and 4 resulting in the sixty four Q codes of Concatenated ADRC Tile B. Alternatively, the generation of each Q code, $Q_i$, in Concatenated ADRC Tile B may be described by the mathematical equation $$Q_i = [q_{i,0}, q_{i,1}, q_{i,2}, q_{i,3}, q_{i,4}] \ i=0, 1, 2, \ldots 63$$

2. Q code reassignment

Q code reassignment ensures that bit errors caused by transmission losses are localized within spatially disjointed pixels. In particular,. during Q code reassignment, Q codes are redistributed and the bits of the redistributed Q codes are shuffled. Accordingly, Q code reassignment facilitates error recovery because undamaged pixels surround each damaged pixel. Furthermore, DR and MIN recovery is aided because pixel damage is distributed evenly throughout an ADRC block.

Figure 12:
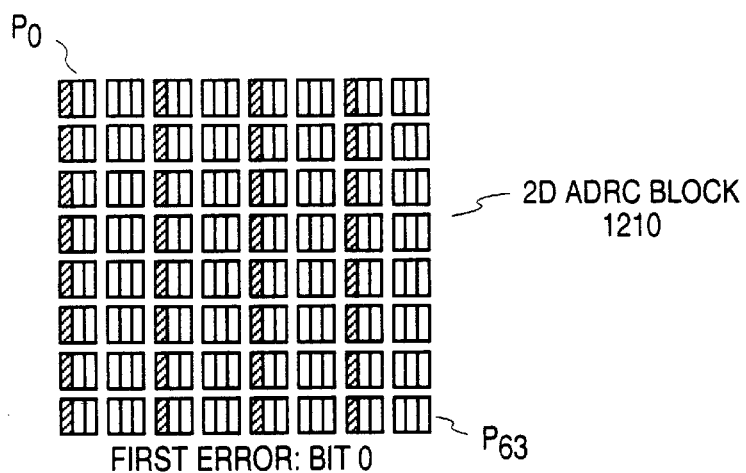
FIG. 12 illustrates one embodiment of pixel data error caused by a ⅙ burst error loss.
Figure 12:
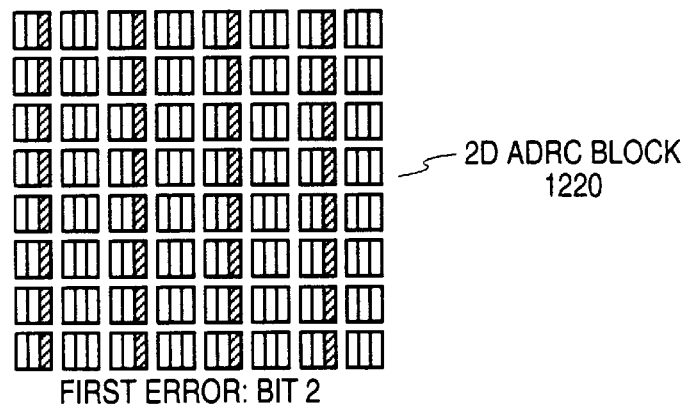
Figure 12:
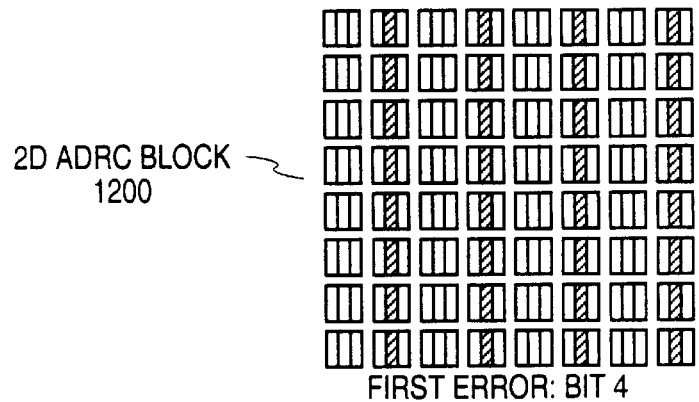

FIG. 12 illustrates one embodiment of pixel corruption during the transmission loss of a ⅙ burst error loss. In particular, 2 D ADRC Blocks 1210, 1220, and 1230 each include sixty-four pixels encoded using three bits. Accordingly, each pixel, $P_0$ through $P_{63}$, of a 2 D ADRC block may be represented by three bits. 2 D ADRC Block 1210 shows the bit loss pattern, indicated by a darkened square, of bits when the first bit of every six bits are lost. Similarly, the bit loss pattern when the second bit or fourth bit of every six bits are lost are shown in 2 D ADRC Blocks 1220 and 1230, respectively. FIG. 12 illustrates that without Q code reassignment one-half of all the pixels 2 D ADRC Blocks 1210, 1220, and 1230 are corrupted for a ⅙ burst error loss.

For one embodiment, Q code reassignment may be applied independently to each concatenated ADRC tile stored in a buffer, thus ensuring that bit errors are localized within spatially disjointed pixels upon deshuffling. In an alternative embodiment, Q code reassignment may be applied to each ADRC block stored in a buffer.

FIG. 12a illustrates one embodiment of Q code reassignment that generates a bitstream of shuffled Q code bits from a concatenated ADRC tile. Table 122 and Table 132 illustrate the Q code redistribution. Bitstreams 130 and 140 illustrate the shuffling of Q code bits.

Table 122 shows the concatenated Q codes for Concatenated ADRC Tile A. $Q_0$ is the first concatenated Q code and $Q_{63}$ is the final concatenated Q code. Table 132 illustrates the redistribution of Q codes. For one embodiment $Q_0$, $Q_6$, $Q_{12}$, $Q_{18}$, $Q_{24}$, $Q_{30}$, $Q_{36}$, $Q_{42}$, $Q_{48}$, $Q_{54}$, and $Q_{60}$ are included in a first set, partition 0. Following Table 132, the following eleven concatenated Q codes are included in partition 1. The steps are repeated for partitions 2–5. The boundary of a partition is delineated by a vertical line in Table 132. This disjointed spatial assignment of concatenated Q codes to six partitions ensures that a ⅙ burst error loss results in a bit loss pattern distributed across a group of non-consecutive pixels.

Figure 12B:
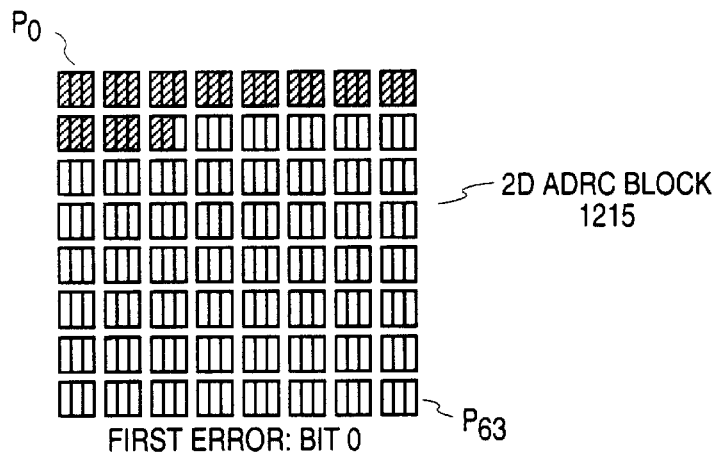
FIG. 12b illustrates one embodiment of pixel data error caused by a 1/6 burst error loss of redistributed Q codes.
Figure 12B:
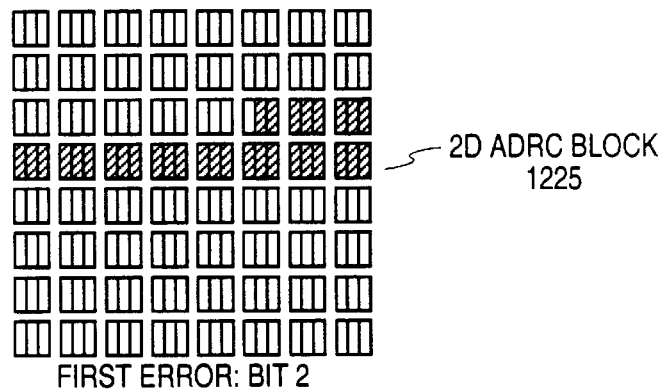
Figure 12B:
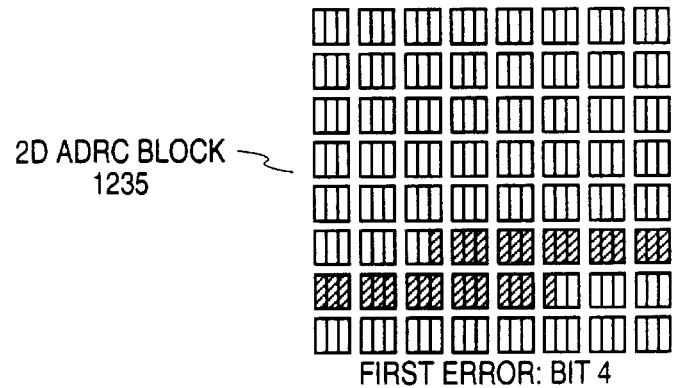

FIG. 12b illustrates one embodiment of the bit pattern loss created by the ⅙ burst error loss of redistributed Q codes. In particular, 2 D ADRC blocks 1215, 1225, and 1235 each include sixty four pixels encoded using three bits. Accordingly, each pixel $P_0$ through $P_{63}$, of each 2 D ADRC block, is represented by three bits. In 2 D ADRC Blocks 1215, 1225, and 1235 the bit loss pattern, indicated by a darkened square, is localized across a group of consecutive pixels. Accordingly, only eleven non-consecutive pixels within each 2 D ADRC Block 1215, 1225, and 1235 are corrupted for a given segment loss. In an alternative embodiment, Q code assignment to partitions include Q codes from different motion blocks, thus providing both a disjointed spatial and temporal assignment of Q codes to six segments. This results in additional undamaged spatial-temporal pixels during a ⅙ burst error loss and further facilitates a more robust error recovery.

Referring to FIG. 12a, the bits of the redistributed Q codes in Table 132 are shuffled across a generated bitstream so that adjacent bits in the bitstream are from adjacent partitions. The Q code bits for all the partitions in Table 132 are concatenated into Bitstream 130. For a given partition adjacent bits in Bitstream 130 are scattered to every sixth bit location in the generated Bitstream 140. Accordingly, bits number zero through five, of Bitstream 140, include the first bit from the first Q code in each partition. Similarly, bits number six through eleven, of Bitstream 140, include the second bit from the first Q code in each partition. The process is repeated for all Q code bits. Accordingly, a ⅙ burst error loss will result in a spatially disjointed pixel loss.

Figure 12C:
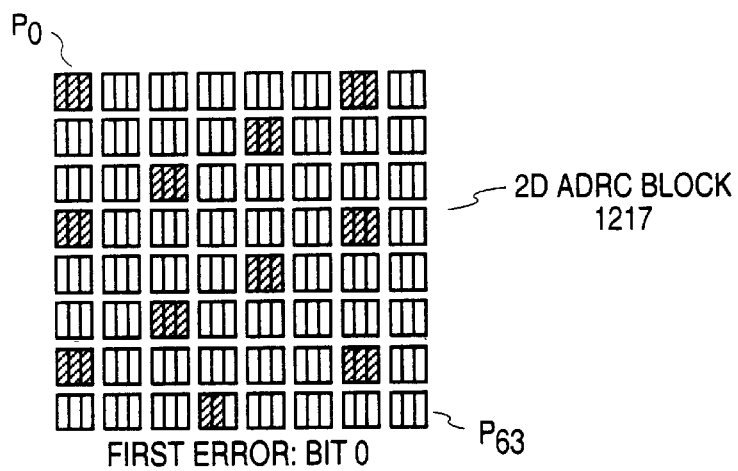
FIG. 12c illustrates one embodiment of pixel data error caused by a ⅙ burst error loss of reassigned Q codes.
Figure 12C:
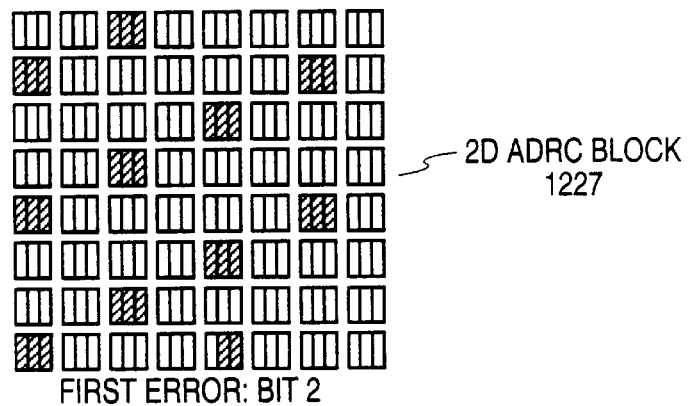
Figure 12C:
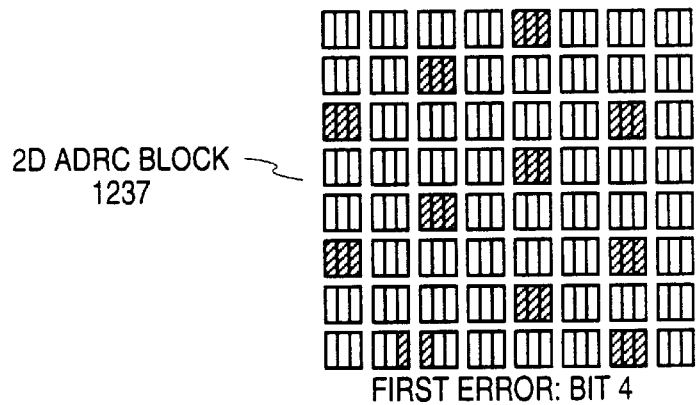

FIG. 12c illustrates one embodiment of the bit pattern loss created by the ⅙ burst error loss of reassigned (i.e., redistributed and shuffled) Q codes. In particular, 2 D ADRC Blocks 1217, 1227, and 1237 each include sixty four pixels encoded using three bits. Accordingly, each pixel $P_0$ through $P_{63}$, of each 2 D ADRC Block, is represented by three bits. In 2 D ADRC Blocks 1217, 1227, and 1237, the bit loss pattern, indicated by a darkened square, is distributed across spatially disjointed pixels, thus facilitating pixel error recovery.

3. Time-varying Randomization of Q Codes

If the dynamic range (DR) of a particular block is lost or damaged in transmission, the ADRC decoder must determine how many bits were used to quantize that block without relying on the DR. In one embodiment, this process may be accomplished by applying time-varying randomization to each VL-data block.

Randomization may be applied to destroy the correlation of incorrect candidate decodings that may be generated during a subsequent data decoding process in order to estimate lost or damaged data. The randomization process does not change the properties of the correct candidate decoding, as it is restored to its original condition. In particular, by utilizing randomization across multiple blocks of data, subsequent derandomized data will tend to result in candidate decodings that exhibit highly correlated properties indicative that the corresponding candidate decoding is a good selection.

The randomization process is chosen such that a correct derandomization results in candidate decoding exhibiting highly correlated properties and an incorrect derandomization results in a decoding exhibiting uncorrelated properties.

In addition, the time-varying randomization advantageously handles zero blocks. In one embodiment, time-varying randomization may decrease the likelihood that the decoder will miss data errors by resynchronization (i.e., the decoder incorrectly decoding a set of blocks then correctly decoding subsequent blocks without recognizing the error). Encoding parameters may be used to perform the randomization and derandomization processes. For example, a randomization pattern may be chosen based on the values of the compression parameters.

In one embodiment, $Q_i$ is the Qbit value used to quantize a given VL-data block $x_i$. In this embodiment, this number may be 0, 1, 2, 3, or 4. In one embodiment, a seed value may be used to initialize a pseudorandom number generator (PNG) to create a pseudorandom number sequence. This seed value may vary with the current $Q_i$ on a block-by-block basis. In alternate embodiments, the seed value may be used to generate any suitable mathematical transformation sequence.

In alternate embodiments, the seed value may be generated by the combination of a variety of compression constants to encode the block of data. Such compression constants include, but are not limited to, Qbit value, Motion Flag (MF), MIN, MAX, CEN, DR, and block address (BA), in which BA identifies a particular pixel location within the block of data. These values may be combined by summation and/or multiplication and may be generated from a combination of the current block and prior and/or subsequent blocks of data.

For example, in one embodiment, the MF and Qbit values may be used to define the seed value as follows:

$$\text{seed} = 5 \cdot MF_i + Q_i$$

where $Q_i$ represents the number of Qbit values and $MF_i$ represents the motion flag value.

In alternate embodiments, the seed value may be generated as follows:

$$(10 \cdot BA_i) + (5 \cdot MF_i) + Q_i$$

$$(2560 \cdot BA_i) + (10 \cdot DR_i) + (5 \cdot MF_i) + Q_i$$

where $BA_i$ represents BA values and $DR_i$ represents the DR value.

These seed generating combinations may be summed over a number of blocks to generate time-varying seed values. Thus, in one embodiment, the seed may be defined as follows:

$$\sum_{n=0}^{N-1} (5 \cdot MF_n + Q_n) \cdot (10)^n.$$

Figure 12D:
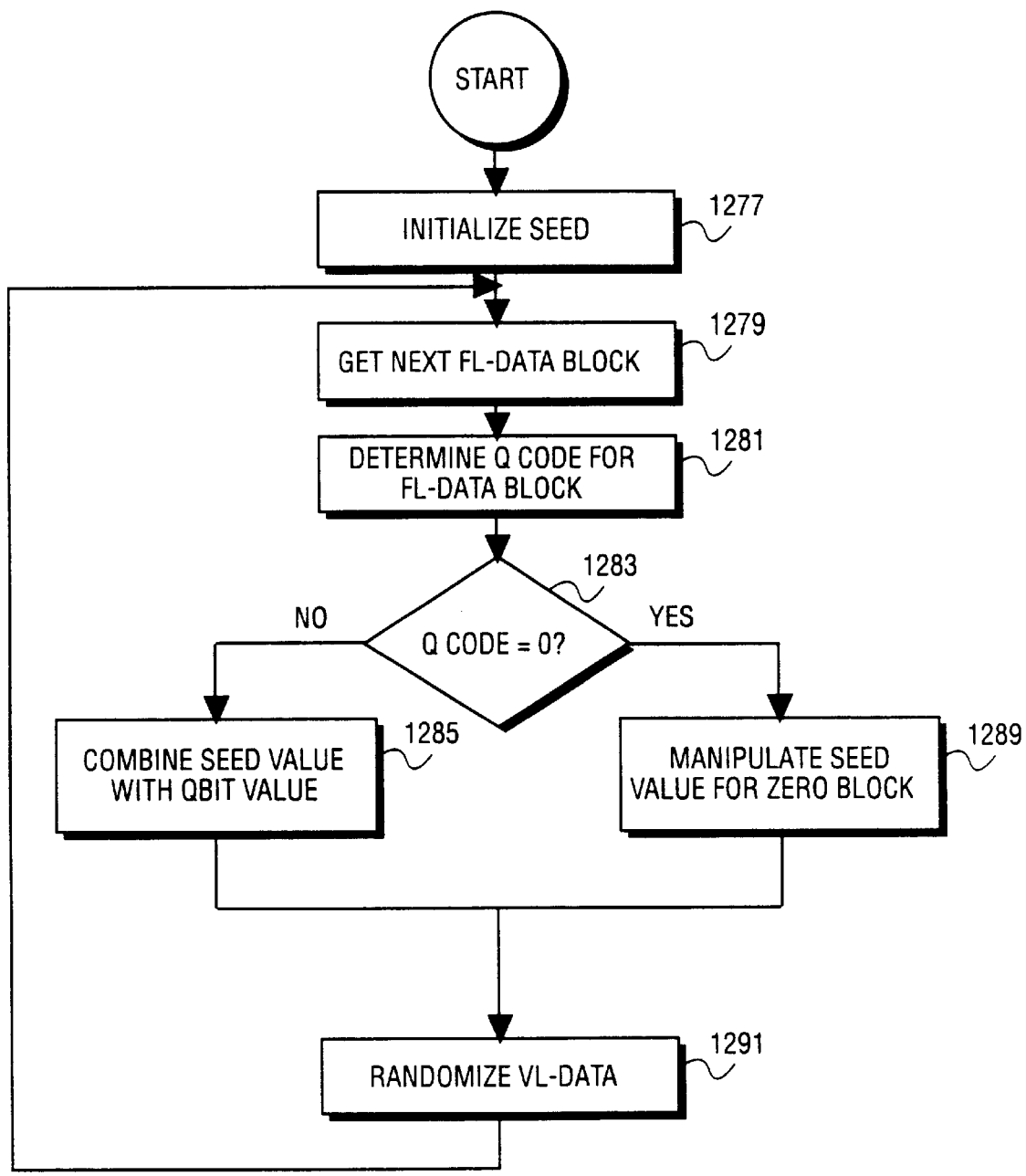
FIG. 12d is a flowchart of one embodiment for a time-varying randomization of Q codes.

FIG. 12d illustrates one embodiment of method for encoding VL-data blocks by time-varying randomization. Initially at step 1277, the seed value may be set to zero. Other initial values may also be used. In one embodiment, the seed value is an 8-bit binary number (e.g., 00000000).

Next, at step 1279, the next VL-data block is retrieved. Then at step 1281, the Qbit value for the VL-data block is determined. In one embodiment, the Qbit value may be determined directly from the DR. In an alternate embodiment, a Qbit value previously determined by the encoder may be used and stored in a data buffer. Next at step 1283, if the Qbit value is not equal to zero, the process continues at step 1285. If the Qbit value is equal to zero, the process continues at step 1289.

If at step 1283, Qbit value is not zero, then at step 1285, the seed value is combined with the Qbit values. In one embodiment, the seed value is shifted left by a number of bits, e.g., two bits. Then the seed value may be combined, for example, concatenated, with the binary equivalent of the Qbit value minus one. (For example, if the current seed value is 00000010 and the binary equivalent of Qbit value minus one is 11, the two steps result in a seed value of 00001011.) Processing then continues at step 1291. if, at step 1283, the Qbit value is zero, then, at step 1289, the seed value is manipulated to indicate a zero block. In one embodiment, the seed value is shifted right one bit. (For example, if the current seed value is 00001011, the result of the right shift is a seed value of 00000101.) In alternate embodiments, the seed value may be set to a specified constant, left shifted in some manner, or manipulated in any advantageous manner.

At step 1291, the VL-data is randomized in accordance with the seed value. In one embodiment, the seed value is used to generate a pseudorandom number sequence using the PRG. A given PRG always generates the-same pseudo-random number sequence using the same seed value. Then, the pseudorandom number sequence is used as a transformation function of the VL-data block. In one embodiment, the VL-data may be randomized by applying a bitwise XOR (exclusive OR) function to the VL-data and the pseudorandom number sequence.

As an example, a sequence of Qbit values for successive temporally adjacent blocks of data may be as follows: ti $Q_1=3, Q_2=2, Q_3=1, Q_i=0, \ldots$ The seed value is initially set to 00000000, (corresponding to step 1277). The first VL-data block, $x_1$, is retrieved and $Q_1$, is determined. In this example, $Q_1$ has a value of 3. The Qbit value is not zero, therefore, steps 1285 and 1287 are executed. The seed value is shifted left two bits, resulting in the seed value 00000000. For block one, $Q_1-1=2$, which has a binary value of 10. The two values are concatenated resulting in a seed value of 00000010. The seed value is then used to generate the pseudorandom number sequence $y_1$ which is bitwise XORed with $x_1$.

The next VL-data block, $x_2$, and its Qbit value, $Q_2$ (value 2), are retrieved. For block two, $Q_2-1=1$, which has a binary value of 01. The current seed value is shifted left two bits, resulting in 00001000. The two values are concatenated resulting in a new seed value of 00001001. The new seed value is then used to generate the pseudorandom number sequence $Y_2$ which is bitwise XORed with $x_2$.

The next VL-data block, $x_3$, and its Qbit value, $Q_3$ (value 1), are retrieved. For block three, $Q_3-1=0$, which has a binary value of 00. The current seed value is shifted left two bits, resulting in 00100000. The two values are concatenated resulting in a new seed value of 00100100. The new seed value is then used to generate the pseudorandom number sequence $y_3$ which is bitwise XORed with $x_3$.

The next VL-data block, $x_4$, and its Qbit value, $Q_4$ (value 0), are retrieved. Because the Qbit value is 0 (a zero block), the seed value is shifted to the right one bit, corresponding to step 1289. This results in a new seed value of 00010010. The new seed value is then used to generate the pseudorandom number sequence $y_4$ which is bitwise XORed with $x_4$.

FIGS. 10–12 illustrate intra group VL-data shuffling tolerated up to 1/6 packet data loss during transmission. It will be appreciated by one skilled in the art, that the number of total partitions and bit separation can be varied to ensure against 1/n burst error loss.

Inter Segment FL-Data Shuffling

Inter segment FL-data shuffling describes rearranging block attributes among different segments. Rearranging block attributes provides for a distributed loss of data. In particular, when FL-data from a segment is lost during transmission the DR value, MIN value, and Motion Flag value lost do not belong to the same block. FIGS. 13 and 14 illustrate one embodiment of inter segment FL-data shuffling.

FIG. 13 illustrates the contents of Segments 0 to 5. For one embodiment, each segment comprises 880 DRs, 880 MINs, 880 Motion Flags, and VL-data corresponding to 660 Y-blocks, 110 U-blocks, and 110 V-blocks. As illustrated in graph MIN Shuffling 1300, the MIN values for Segment 0 are moved to Segment 2, the MIN values for Segment 2 are moved to Segment 4, and the MIN values for Segment 4 are moved to Segment 0. Additionally, the MIN values for Segment 1 are moved to Segment 3, the MIN values for Segment 3 are moved to Segment 5, and the Motion Flag values for Segment 5 are moved to Segment 1.

Figure 13A:
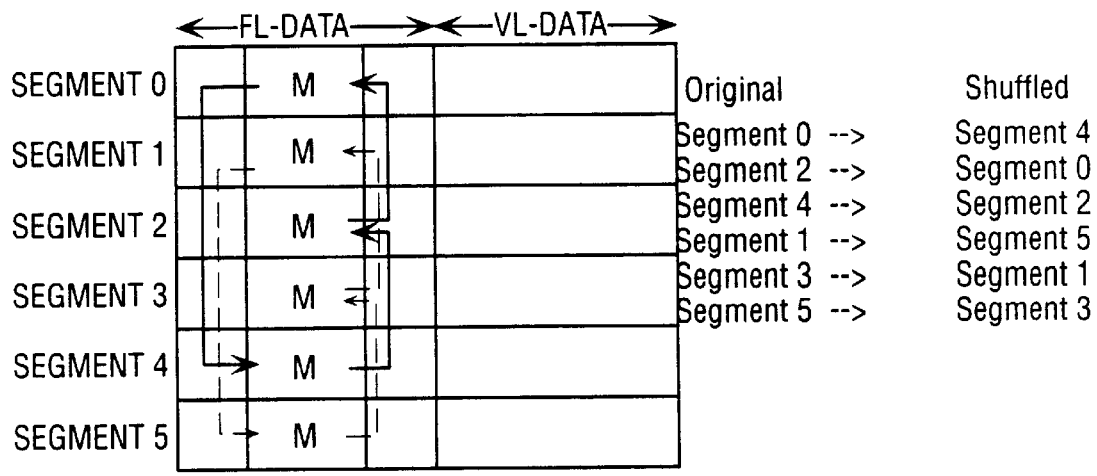
FIG. 13a illustrates one embodiment of Motion Flag shuffling and of a fixed length data loss in one frame pair.

FIG. 13*a* illustrates Motion Flag shuffling. As illustrated, in graph Motion Flag Shuffling 1305, the Motion Flag values for Segment 0 are moved to Segment 4, the Motion Flag values for Segment 2 are moved to Segment 0, and the Motion Flag values for Segment 4 are moved to Segment 2. Additionally, the Motion Flag values for Segment 1 are moved to Segment 5, the Motion Flag values for Segment 3 are moved to Segment 1, and the Motion Flag values for Segment 5 are moved to Segment 3. Loss pattern 1310 illustrates the FL-data loss after Segment 0 is lost during transmission.

For a specific block attribute, both FIG. 13 and FIG. 13*a* illustrate shuffling all instances of the specific block attribute between segments. For example, in FIG. 13 the 880 MIN values from Segment 0 are collectively exchanged with the 880 MIN values in Segment 2. Similarly, in FIG. 13*a* the 880 Motion Flags for Segment 0 are collectively exchanged with the 880 Motion Flags in Segment 4. During a transmission loss of consecutive packets, this collective shuffling of block attributes results in a disproportionate loss of a specific block attributes for a block group. In one embodiment, a block group includes three ADRC blocks.

FIG. 14 illustrates one embodiment of a modular three shuffling process for DR, MIN, and Motion Flag values. In an alternate embodiment, CEN may also be used in the shuffling process. A modular three shuffling describes a shuffling pattern shared across three blocks (i.e., a block group) in three different segments. The shuffling pattern is repeated for all block groups within the three different segments. However, a different shuffling pattern is used for different block attributes. Accordingly, the modular three shuffling process distributes block attributes over all three segments. In particular, for a given block group a modular three shuffling ensures that only one instance of a specific block attribute is lost during the transmission loss of a segment. Thus, during the data recovery process, described below, a reduced number of candidate decodings are generated to recover data loss within a block.

As illustrated in DR Modular Shuffle 1410, a segment stores 880 DR values. Accordingly, the DR values are numbered 0–879 dependent on the block from which a given DR value is derived. In a modular three shuffling the FL-data contents of three segments are shuffled. A count of 0–2 is used to identify each DR value in the three segments identified for a modular shuffling. Accordingly, DR's belonging to blocks numbered 0, 3, 6, 9 . . . belong to Count 0. Similarly, DR's belonging to blocks numbered 1, 4, 7, 10, . . . belong to Count 1 and DR's belonging to blocks numbered 2, 5, 8, 11 . . . belong to Count 2. Thus, for a given count the DR values associated with that count are shuffled across Segment 0, 2, and 4. Similarly, the DR values associated with the same count are shuffled across Segments 1, 3, and 5.

In DR Modular Shuffle 1410, the DR values belonging to Count 0 are left un-shuffled.. The DR values belonging to Count 1 are shuffled. In particular, the Count 1 DR values in Segment A are moved to Segment B, the Count 1 DR values in Segment B are moved to Segment C, and the Count 1 DR values in Segment C are moved to Segment A.

The DR values belonging to Count 2 are also shuffled. In particular, the Count 2 DR values in Segment A are moved to Segment C, the Count 2 DR values in Segment B are moved to Segment A, and the Count 2 DR values in Segment C are moved to Segment B.

MIN Modular Shuffle 1420 illustrates one embodiment of a modular three block attribute shuffling process for MIN values. A segment includes 880 MIN values. In MIN Modular Shuffle 1420, the shuffling pattern used for Count 1 and Count 2 in DR Modular Shuffle 1410 are shifted to Count 0 and Count 1. In particular, the shuffling pattern used for Count 1 in DR Modular Shuffle 1410 is applied to Count 0. The shuffling pattern used for Count 2 in DR Modular Shuffle 1410 is applied to Count 1 and the MIN values belonging to Count 2 are left un-shuffled.

Motion Flag Modular Shuffle 1430 illustrates one embodiment of a modular three block attribute shuffling process for Motion Flag values. A segment includes 880 Motion Flag values. In Motion Flag Modular Shuffle 1430, the shuffling pattern used for Count 1 and Count 2 in DR Modular Shuffle 1410 are shifted to Count 2 and Count 0 respectively. In particular, the shuffling pattern used for Count 2 in DR Modular Shuffle 1410 is applied to Count 0. The shuffling pattern used for Count 1 in DR Modular Shuffle 1410 is applied to Count 2 and the Motion Flag values belonging to Count 1 are left un-shuffled.

FIG. 14a illustrates the modular shuffling result of Modular Shuffles 1410, 1420, and 1430. Modular Shuffle Result 1416 shows each attribute destination of blocks belonging to Segment 0. In this example, Segment 0 corresponds to Segment A of FIG. 14. This destination is defined according to Modular Shuffles 1410, 1420, and 1430 of FIG. 14. FIG. 14a also illustrates the distribution loss of block attributes after Segment 0 is lost during transmission. In particular, Loss Pattern 1415 shows the DR, Motion Flag, and MIN values loss across six segments after a subsequent deshuffling is applied to the received data that was initially shuffled using Modular Shuffles 1410, 1420, and 1430. In alternate embodiments, CEN value may also be used in the shuffling and deshuffling process. As illustrated in FIG. 14a, the block attribute loss is distributed periodically across Segments 0, 2, and 4 while Segments 1, 3, and 5 have no block attribute loss. Additionally, Spatial Loss Pattern 1417 illustrates the deshuffled spatial distribution of damaged FL-data after Segment 0 is lost during transmission. Spatial Loss Pattern 1417 shows the DR, Motion Flag, and MIN value loss after a subsequent deshuffling is applied to the received data. In Spatial Loss Pattern 1417, a damaged block is surrounded by undamaged blocks and damaged block attributes can be recovered with surrounding undamaged blocks.

FIG. 14 and FIG. 14a illustrate a modular three shuffling pattern and the distribution loss of block attributes after a segment is lost during transmission. In alternative embodiments, the count variables or the number of segments are varied to alternate the distribution of lost block attributes. FIG. 14b illustrates Modular Shuffle Result 1421 and Loss Pattern 1420. Similarly, FIG. 14c illustrates Modular Shuffle Result 1426 and Loss Pattern 1425. Both Loss Pattern 1420 and Loss Pattern 1425 illustrate the distribution loss of block attributes across six segments; as opposed to three segments as previously described.

It is contemplated that in alternate embodiments various combinations of block attributes will be distributed to perform the shuffling process.

Inter Segment VL-Data Shuffling

Figure 15:
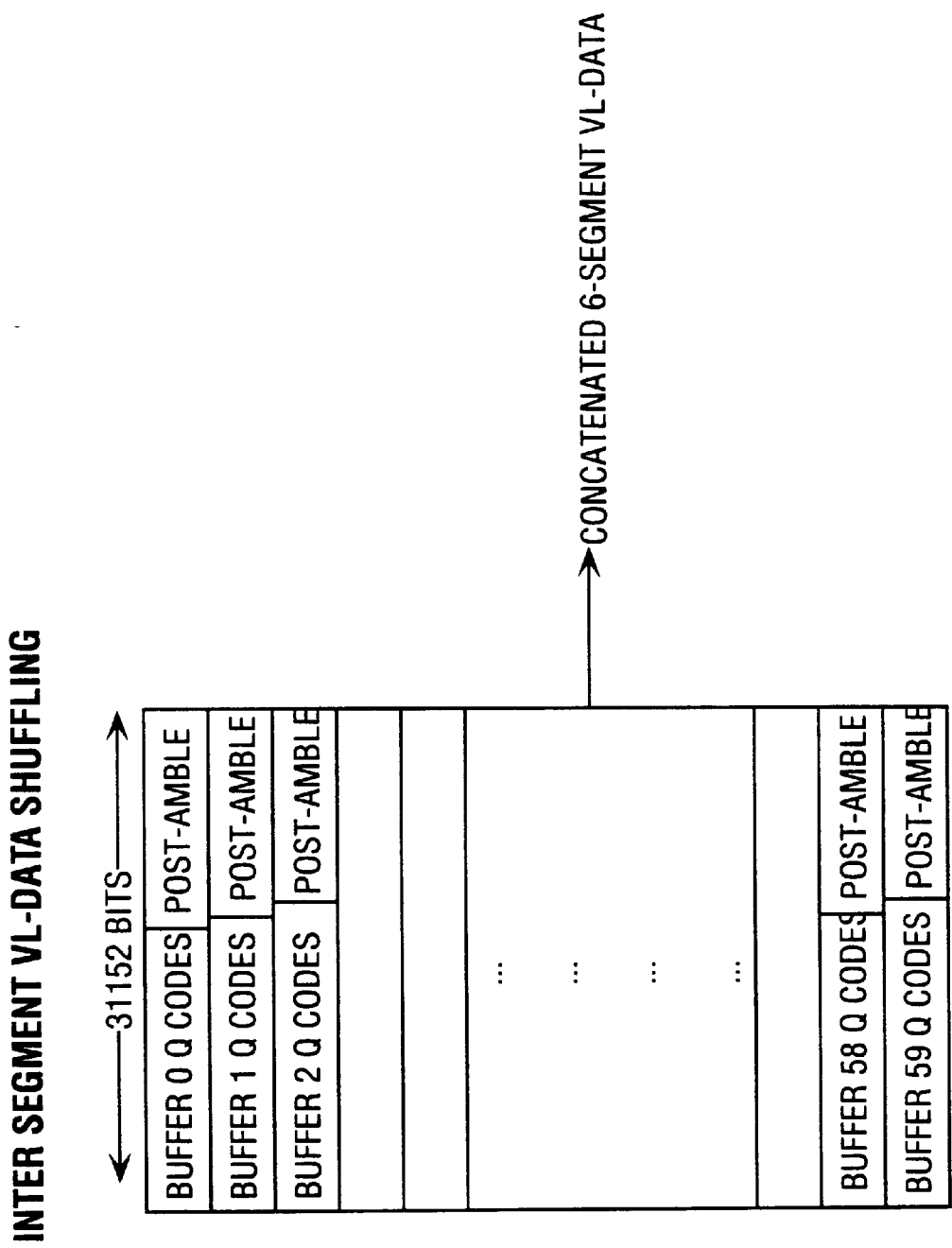
FIG. 15 illustrates one embodiment of variable length data buffering in a frame set.
Figure 16:
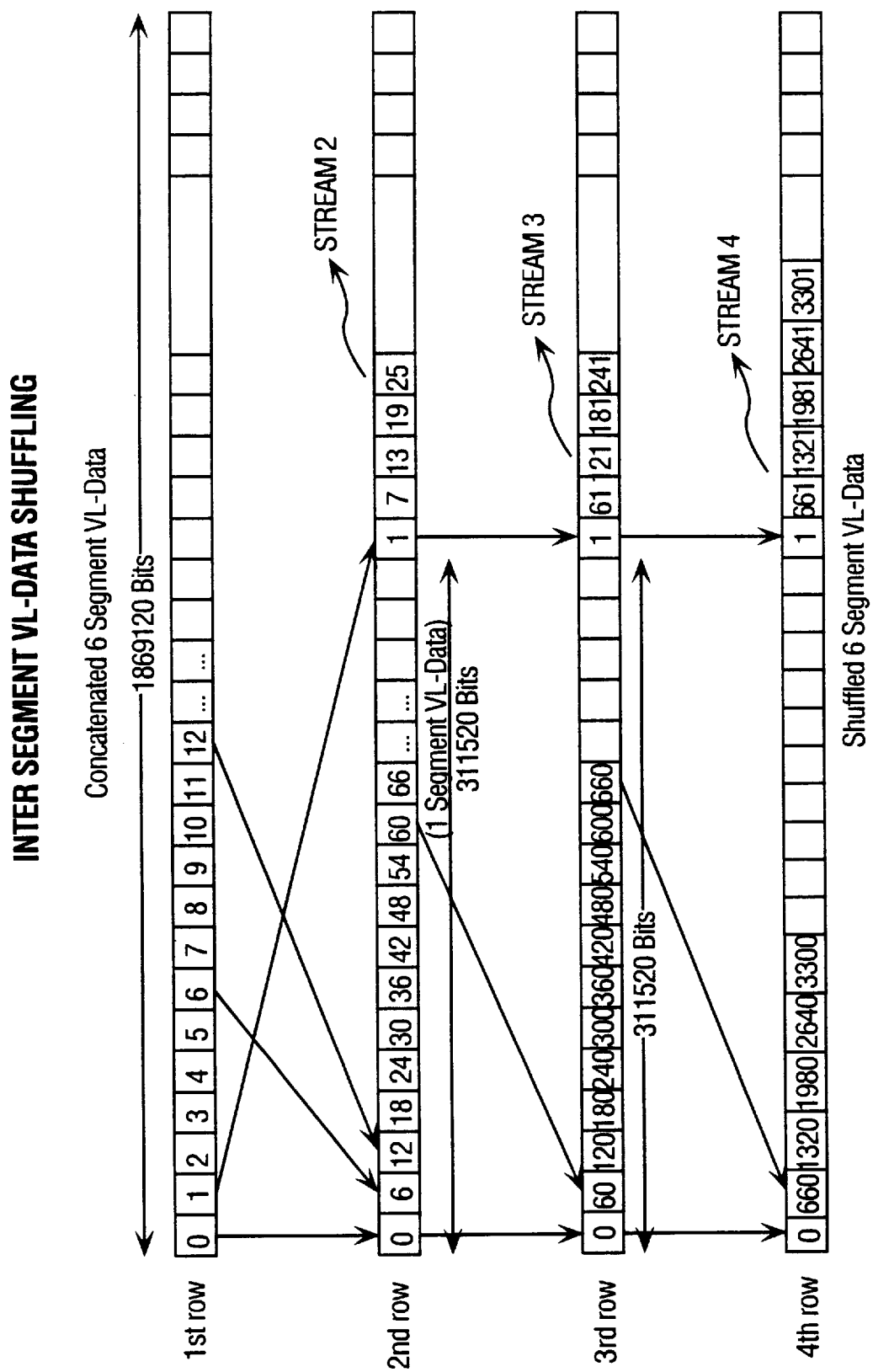
FIG. 16 illustrates one embodiment of inter segment VL-data shuffling.

In the inter segment VL-data shuffling process, bits between a predetermined number of segments, for example, 6 segments, may be arranged to ensure a spatially separated and periodic VL-data loss during an up to ⅙ packet transmission loss. FIGS. 15 and 16 illustrate one embodiment of the inter segment VL-data shuffling process.

In the present embodiment, a transmission rate approaching 30 Mbps is desired. Accordingly, the desired transmission rate results in 31,152 bits available for the VL-data in each of the 60 buffers. The remaining space is used by FL-data for the eighty-eight blocks included in a buffer. FIG. 15 includes the VL-data buffer organization within a frame set for a transmission rate approaching 30 Mbps. As previously described, partial buffering is used to maximize the usage of available VL-data space within each buffer, and the unused VL-data space is filled with a post-amble.

FIG. 16 illustrates one embodiment of the shuffling process to ensure a spatially separated and periodic VL-data loss. The first row illustrates the VL-data from the 60 buffers in FIG. 15 rearranged into a concatenated stream of 1,869, 120 bits. The second row illustrates the collection of every sixth bit into a new stream of bits. Thus, when the decoder subsequently reverses the process, a burst loss of up to ⅙ of the data transmitted is transformed into a periodic loss where at least 5 undamaged bits separate every set of two damaged bits.

The third row illustrates grouping every 10 bits of Stream 2 into a new stream of bits, Stream 3. The boundary of a grouping is also defined by the number of bits in a segment. Grouping of Stream 2 for every tenth bit ensures that a 1/60 data loss results in fifty-nine undamaged bits between every set of two damaged bits. This provides for a spatially separated and periodic VL-data loss in the event that 88 consecutive packets of data are lost.

The fourth row illustrates grouping every 11 bits of Stream 3 into Stream 4. The boundary of a grouping is also defined by the number of bits in a segment. Grouping of Stream 3 for every eleventh bit ensures that 1/660 data loss results in 659 undamaged bits between to damaged bits, resulting in a spatially separated and periodic VL-data loss during a transmission loss of 8 consecutive packets.

Each group of 31,152 bits within Stream 4 is consecutively re-stored in Buffers 0–59, with the first group of bits stored in Buffer 0 and the last group of bits stored in Buffer 59.

It will be appreciated by one skilled in the art that the grouping requirements of FIG. 16 are variable to ensure a spatially separated and periodic VL-data loss tolerance up to a 1/n transmission loss.

Transmission

The previously described shuffling process creates buffers with intermixed FL-data. For one embodiment, packets are generated from each buffer, according to packet structure 200, and transmitted across Transmission media 135. The data received is subsequently decoded. Lost or damaged data may be recovered using data recovery processes.

Decoding

Referring again to FIG. 4, a flow diagram illustrating one embodiment of decoding process performed by Decoder 120 is shown. In one embodiment, the conversion and de-shuffling processes are the inverse of the processes represented in FIG. 3. However, in one embodiment, time-varying derandomization of Q codes and delayed decision decoding may be performed within step 435 as discussed below.

Time-varying Derandomization of Q Codes and Delayed Decision Decoding

If the dynamic range (DR) of a particular block is lost or damaged in transmission, the ADRC decoder must determine how many bits were used to quantize that block without relying on the DR. In one embodiment, this process may be accomplished by applying time-varying derandomization to each VL-data block as it is received at the decoder.

Randomization, and the subsequent derandomization of data, may be applied to destroy the correlation of incorrect candidate decodings that may be generated during the data decoding process in order to estimate lost or damaged data. The derandomization process does not change the properties of the correct candidate decoding, as it is restored to its original condition. Derandomized data will tend to result in a candidate decoding that exhibits highly correlated properties indicating that the corresponding candidate decoding is a good selection.

The derandomization process may result in candidate decodings exhibiting highly correlated properties and an incorrect derandomization may result in a decoding exhibiting uncorrelated properties. In addition, the time-varying derandomization advantageously handles zero blocks. In one embodiment, the time-varying randomization may decrease the likelihood that the decoder will miss data errors by resynchronization (i.e., the decoder incorrectly decoding a set of blocks then correctly decoding subsequent blocks without recognizing the error). Encoding parameters may be used to perform the derandomization processes. For example, a derandomization pattern may be chosen based on the values of the compression parameters.

In one embodiment, if DR arrives at the decoder undamaged, the Qbit value is determined by the given threshold table defined for the ADRC algorithm. In this embodiment, the decoder can easily determine the proper update for its copy of the randomizing or seed value. In one embodiment, if DR is damaged, the decoder attempts to decode the block with all possible Qbit values and associated possible randomizing or seed values to generate candidate decodings. In this embodiment, a local correlation metric is applied to each candidate decoding and a confidence metric is computed for the block.

In one embodiment, the block may not be dequantized yet as the decoder implements a delayed-decision decoder. In one embodiment, the delayed-decision decoder delays the decoding of the data by four blocks. If the decoder calculates four, consecutive low confidence metrics, it concludes that the decoding of the oldest block was incorrect. In that case, an alternate decoding, for example, the next most likely decoding is then evaluated. In one embodiment, the three more recent blocks are derandomized using the alternate guess at seed value used for derandomization. This continues until a sequence of four decoded blocks are produced where the most recent block's confidence metric is greater than a given threshold value $\tau$.

Figure 17:
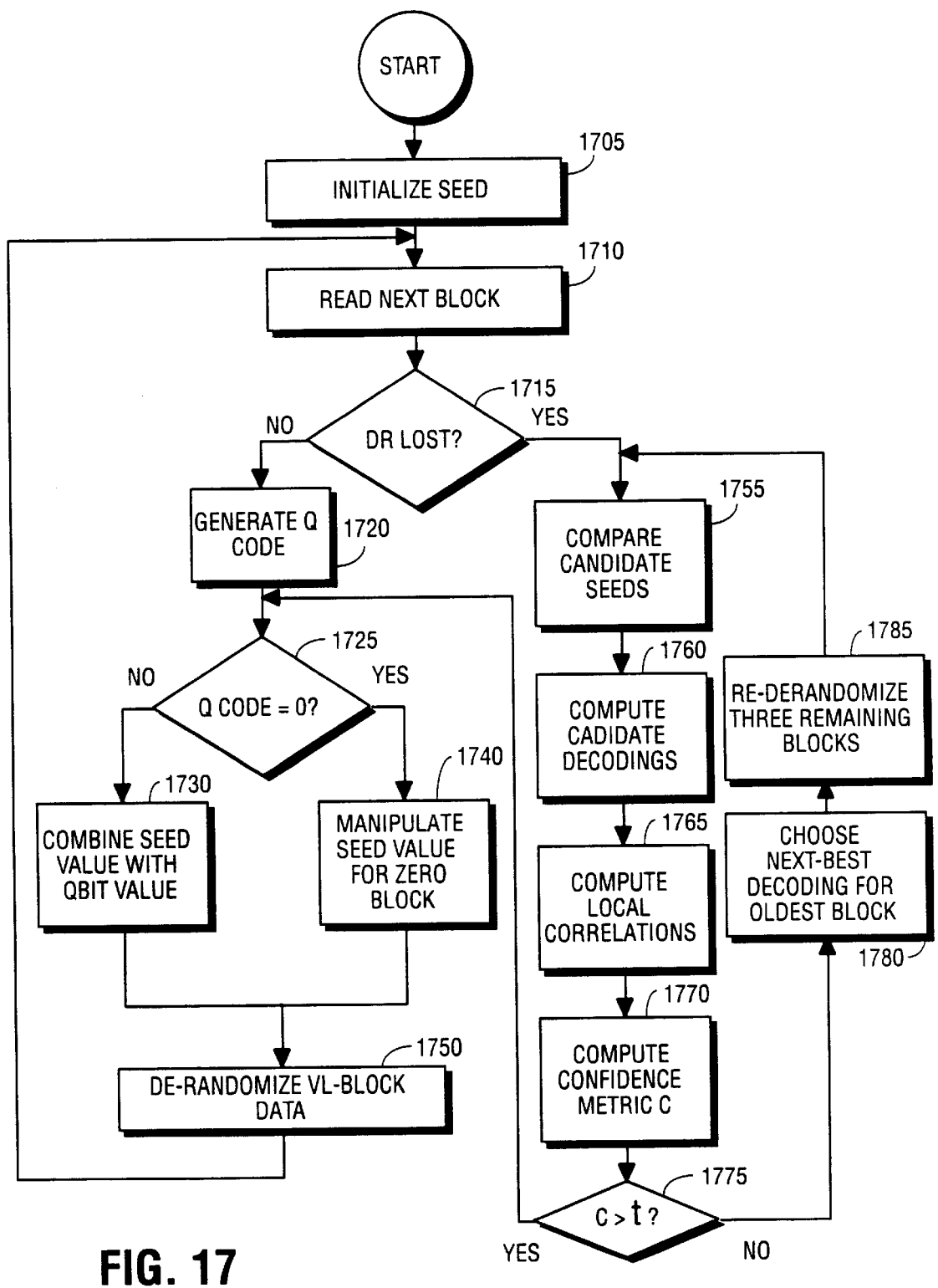
FIG. 17 is a flowchart of one embodiment for a delayed-decision, time-varying derandomization of Q codes.

FIG. 17 is a flowchart of one embodiment for the time-varying derandomization of VL-data blocks using a seed value. Initially at step 1705, a seed value is set to zero. In one embodiment, the seed value is an 8-bit binary number (e.g., 00000000).

At step 1710 the next VL-data block is retrieved. Then at step 1715, it is determined whether the DR of the VL-data block is lost or damaged. If the DR is intact, processing continues at step 1720. If the DR is not intact (either lost or damaged), processing continues at step 1755.

If at step 1715, the DR for the current VL-data block is intact, steps 1720 through 1750 are performed to derandomize the VL-data. The steps are similar to steps 1281 through 1293 described above in reference to FIG. 12*d*.

If at step 1715, the DR is lost or damaged, processing continues at step 1755. At step 1755, all possible candidate seed values for the current block are computed. In one embodiment, all five possible candidate seed values are computed from the current seed value for the current VL-data block. In this embodiment, the five possible seed values may be:

$$xx00 \quad Q = 1$$
$$xx01 \quad Q = 2$$
$$xx10 \quad Q = 3$$
$$xx11 \quad Q = 4$$
$$x \quad Q = 0$$

where xx is the seed value as it existed prior to the application of the process to the current block. The last value is for the zero block in which the seed value is sifted right 1 bit.

Next, at step 1760, the current block is derandomized for all possible seed values. The derandomization of each possible seed value is similar to processing steps 1720 through 1750. Then, at step 1765, the correlations of the possible seed values are computed.

The computation of correlation values may be determined using a variety of methods including, but not limited to, least squares estimates, linear regression, or any suitable method. One method of determining correlation values is described in more detail in "Source Coding To Provide For Robust Error Recovery During Transmission Losses," PCT application No. PCTUS98/22347 assigned to the assignee of the present invention.

Next, at step 1770, using a candidate seed value, the confidence metric for the block if determined. If at step 1775, the confidence metric $c_i$ is above a threshold $\tau$, the candidate Qbit value to derandomize the current VL-data block is used beginning at step 1725.

However, if the confidence metric $c_i$ is below the threshold $\tau$, then processing continues at step 1780. At step 1780, the confidence metric for the oldest block retained in memory is examined. In one embodiment, up to four blocks may be maintained. Thus, in this embodiment, the confidence metric $c_{i-3}$ is examined. If the confidence metric for the oldest block is less than $\tau$, then, at step 1780, an alternate or next-best decoding for the oldest block and is chosen the oldest block is derandomized.

At step 1785, the remaining three blocks in memory are re-derandomized based on this new alternate seed value obtained in step 1780. The re-derandomizing of the remaining blocks is similar to processing steps 1725 through 1750. Processing then returns to step 1755 and repeats steps 1780 through 1785 until the confidence metric of the most recent block, $c_i$, is greater than $\tau$.

In one embodiment, a confidence metric determines when the local correlation metric has failed to produce the correct decoding from among the possible candidate decodings. In one embodiment, the most likely decoding candidate for correlation-based decoding exhibits higher correlation properties as compared to the next-most-likely decoding candidate. The confidence metric is a numerical measurement of the degree to which the best candidate exhibits the higher correlation for any given block. In one embodiment, the decoder performs every possible candidate decoding and then attempts to determine the appropriate decoding based on local correlation. In this embodiment, the decoder determines a confidence metric based on the two most likely decodings, i.e., the two decodings that exhibit the largest local correlation. This metric indicates the degree to which the most likely decoding is superior to the next-most-likely decoding.

In one embodiment, a decoding that produces no clearly superior choice based on the local correlation structure in the block would have a low confidence metric. Blocks in which there is one decoding that produces a much larger correlation than any of the other possible decodings would have a large confidence metric. In one embodiment, if the decoder computes n consecutive low confidence metrics then it would conclude that a decoding error occurred in the decoding of the oldest block.

For example, if the decoder determines the correlations (C) of four derandomized blocks as follows:

$C_{-3}$ low $C_{-2}$ low $C_{-1}$ high $C_0$ high (where $C_0$ is the most recently derandomized block and $C_{-3}$ is the oldest derandomized block), then decoder may assume that block −3 was correctly derandomized.

If decoder determines the correlations of the four derandomized blocks as follows:

$C_{-3}$ high $C_{-2}$ low $C_{-1}$ low $C_0$ low, decoder may not make a determination if block −2, −1, and 0 are correctly decoded until decoder derandomized the next block.

If the next block derandomized has a high correlation, the correlations of the four derandomized blocks may be as follows:

$C_{-3}$ low $C_{-2}$ low $C_{-1}$ low $C_0$ high.

Decoder may assume that the three low correlation blocks (−3, −2, −1) were derandomized correctly.

However, if the next block derandomized has a low correlation, the correlations of the four-derandomized blocks may be as follows:

$C_{-3}$ low $C_{-2}$ low $C_{-1}$ low $C_0$ low.

The decoder may assume that the oldest block (−3) was incorrectly derandomized and will explore the oldest block's alternative derandomizations to find the next-most-likely candidate for derandomization. In one embodiment, it is only when all four blocks have low correlation values that the alternatives for the oldest block may be examined. In alternate embodiments, a greater or lesser number of low correlation blocks may be used or a combination of low and high correlations of varying number.

The invention has been described in conjunction with the preferred embodiment. It is evident that numerous alternatives, modifications, variations and uses will be apparent to those skilled in the art in light of the foregoing description.

What is claimed is:

1. A memory for storing data for access by an application program being executed on a data processing system, comprising:

a data structure stored in said memory, said data structure including information resident in a database used by said application program and comprising,
a plurality of packet structures used for the transmission of data, wherein each packet structure comprises a dynamic range data object of spatially and temporally disjointed data objects within the data, and
a set of block attributes for each dynamic range data object.

* * * * *